(12) United States Patent
Koga et al.

(10) Patent No.: US 7,762,514 B2
(45) Date of Patent: Jul. 27, 2010

(54) FEEDING APPARATUS

(75) Inventors: Yoshitaka Koga, Chiryu (JP); Jueru Shimizu, Handa (JP); Hirokazu Suzumura, Aichi-gun (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/402,054

(22) Filed: Mar. 11, 2009

(65) Prior Publication Data

US 2009/0243327 A1 Oct. 1, 2009

(30) Foreign Application Priority Data

Mar. 27, 2008 (JP) ............................. 2008-083149
Aug. 25, 2008 (JP) ............................. 2008-215044

(51) Int. Cl.
 *F16M 13/00* (2006.01)
(52) U.S. Cl. ................................... 248/429; 297/344.1
(58) Field of Classification Search ................. 248/424, 248/429, 430; 297/344.1; 74/89.23
See application file for complete search history.

(56) References Cited

U.S. PATENT DOCUMENTS

2007/0114355 A1* 5/2007 Koumura ..................... 248/429
2008/0078908 A1 4/2008 Koga
2009/0236488 A1* 9/2009 Koga et al. .................. 248/429
2009/0243326 A1* 10/2009 Kimata et al. ............ 296/65.15
2010/0044542 A1* 2/2010 Koga .......................... 248/429
2010/0051776 A1* 3/2010 Koga et al. .................. 248/429
2010/0052390 A1* 3/2010 Dagcioglu et al. .......... 297/324

* cited by examiner

*Primary Examiner*—Ramon O Ramirez
(74) *Attorney, Agent, or Firm*—Oblon, Spivak, McClelland, Maier & Neustadt, L.L.P.

(57) ABSTRACT

A feeding apparatus includes a screw shaft, a feeding nut, a supporting member, a driving unit, an intermediate member supported by the screw shaft and arranged to be rotatable relative to the supporting member, and an elastic biasing mechanism. The intermediate member includes a radial sliding contact surface slidably contacting a radial bearing surface of the supporting member, first and second thrust sliding contact surfaces contacting first and second thrust bearing surfaces formed at the supporting member, respectively. The elastic biasing mechanism elastically biases the first and second thrust sliding contact surfaces of the intermediate member to contact the first and second thrust bearing surfaces, respectively, and further elastically biases the intermediate member to a thrust receiving member provided at the screw shaft for assembling the intermediate member and the thrust receiving member onto the screw shaft without a clearance between the intermediate member and the thrust receiving member.

20 Claims, 14 Drawing Sheets

FEEDING APPARATUS

CROSS REFERENCE TO RELATED APPLICATIONS

This application is based on and claims priority under 35 U.S.C. §119 to Japanese Patent Application 2008-083149, filed on Mar. 27, 2008, and Japanese Patent Application 2008-215044, filed on Aug. 25, 2008, the entire contents of which are incorporated herein by reference.

FIELD OF THE INVENTION

The present invention generally relates to a feeding apparatus.

BACKGROUND

A feeding apparatus has been employed, as an example, for a power seat slide apparatus for slidably moving an upper rail supporting a vehicle seat relative to a lower rail fixedly connected to a vehicle floor in a forward and backward direction (longitudinal direction) of the vehicle by a driving torque of a motor. In such power seat slide apparatus, a screw shaft is provided between the lower rail and the upper rail. The motor rotatably moves the screw shaft, thereby adjusting a position of the upper rail relative to the lower rail in the forward and backward direction of the vehicle.

As an example for disposing the screw shaft between the lower rail and the upper rail, a structure described below has been proposed. The screw shaft is fitted into a hole portion of a supporting bracket provided at the upper rail and is rotatably supported thereby. Then, a first nut is screwed onto the screw shaft from a front side (a front side in an axial direction of the screw shaft) of the hole portion of the supporting bracket, while a second nut is screwed onto the screw shaft from a rear side (a rear side in the axial direction of the screw shaft) of the hole portion of the supporting bracket. Then, the first and second nuts are fixedly connected onto the screw shaft by compressing an end portion of each of the first and second nuts. The first and second nuts slidably move relative to an inner surface of the hole portion of the supporting bracket. Therefore, the screw shaft is supported rotatably relative to the supporting bracket. Further, a feeding nut is fixed to the lower rail and is screwed onto the screw shaft. Thus, the upper rail slidably moves relative to the lower rail by the rotational movement of the screw shaft.

However, when a load is applied for compressing the end portions of the first and second nuts, the screw shaft receiving the load may be slightly deformed. In such a condition, a torsion is generated at the rotation of the screw shaft, and a smooth rotation of the screw shaft may accordingly be interfered.

Further, even with a slight dimensional error of the first and second nuts, the supporting bracket loosely moves in the axial direction (frontward and backward direction) of the screw shaft. Therefore, the smooth rotation of the screw shaft may be interfered.

A need thus exists for a feeding apparatus, which is not susceptible to the drawback mentioned above.

SUMMARY OF THE INVENTION

According to an aspect of the present invention, a feeding apparatus includes a screw shaft, a feeding nut, a supporting member, a driving unit, an intermediate member and an elastic biasing mechanism. The screw shaft is provided between a fixture member and a movable member relatively movably supported by the fixture member. Further, the screw shaft is rotatably supported by one of the fixture member and the movable member. The screw shaft extends in a moving direction of the movable member. The feeding nut is connected to the other of the fixture member and the movable member and screwed onto a feeding screw portion of the screw shaft. The supporting member is provided at the one of the fixture member and the movable member. The driving unit is employed for transmitting a rotational driving torque to the screw shaft. The intermediate member is supported by the screw shaft and arranged to be rotatable relative to the supporting member. The intermediate member includes a radial sliding contact surface slidably contacting a radial beating surface of the supporting member, a first thrust sliding contact surface slidably contacting a first thrust bearing surface formed at a first side portion of the supporting member, and a second thrust sliding contact surface contacting a second thrust bearing surface formed at a second side portion of the supporting member. The elastic biasing mechanism elastically biases the first and second thrust sliding contact surfaces of the intermediate member to contact the first and second thrust bearing surfaces in an axial direction of the screw shaft, respectively. Further, the elastic biasing mechanism elastically biases the intermediate member in the axial direction of the screw shaft to a thrust receiving member provided at the screw shaft for assembling the intermediate member and the thrust receiving member onto the screw shaft without a clearance between the intermediate member and the thrust receiving member.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
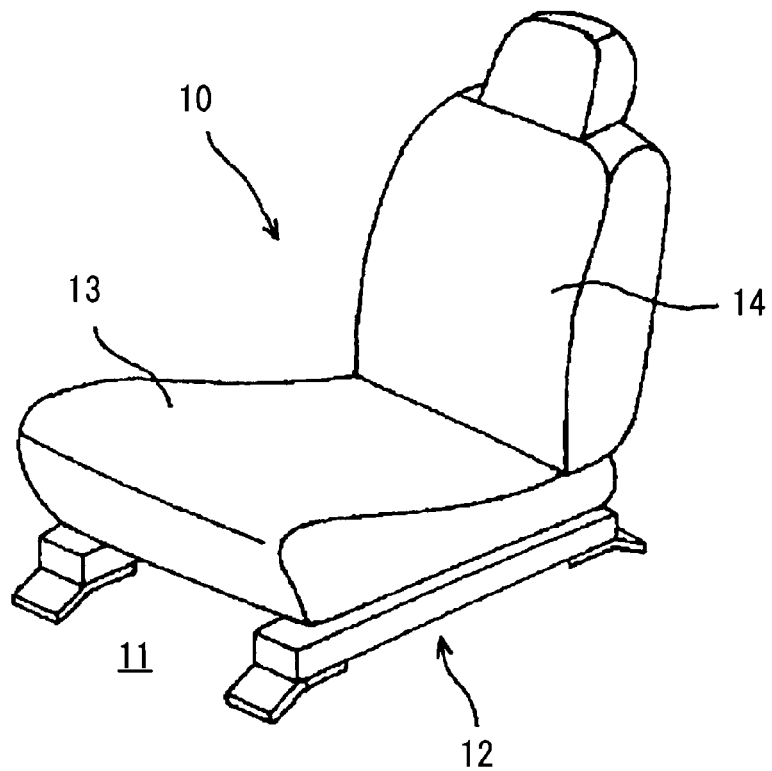
FIG. 1 is a perspective view illustrating a seat for a vehicle according to first to fifth embodiments of the present invention.

A first embodiment of the present invention will be described hereinbelow with reference to the attached drawings. Hereinafter, directions such as "front and rear (longitudinal direction)", "right and left (lateral direction)", "upper and lower (vertical direction)", and the like, correspond to an orientation of a seat 10 for a vehicle, i.e., an orientation seen from an occupant seated thereon. As illustrated in FIG. 1, the seat 10, which is mounted to a vehicle floor 11, includes a power seat slide apparatus 12 of which structure will be described below in detail. The seat 10 further includes a seat cushion 13, which structures a seating surface, and a seatback 14, which structures a back-supporting surface. The seatback 14 is assembled onto a rear end portion of the seat cushion 13 so as to be pivotable in the forward and backward direction relative to the seat cushion 13 and to be fixedly supported at a set recline angle position via a known reclining apparatus.

Figure 2:
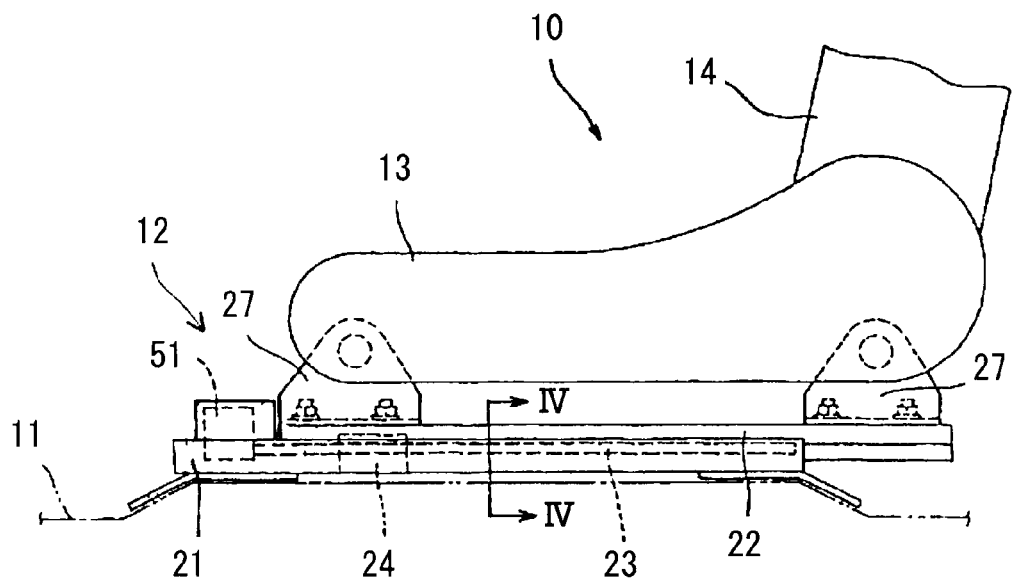
FIG. 2 is a side view illustrating a power seat slide apparatus according to the first embodiment.
Figure 3:
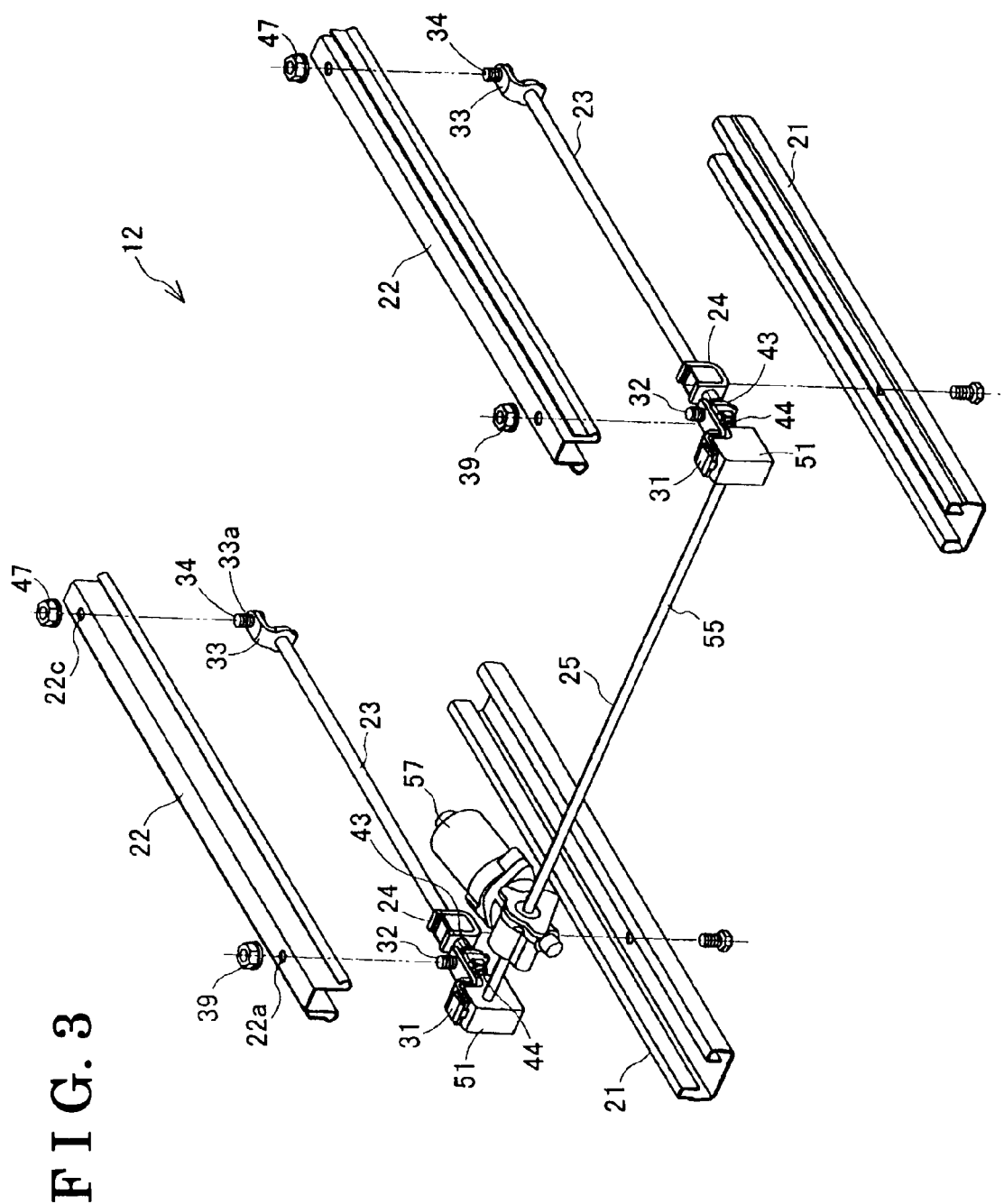
FIG. 3 is an exploded perspective view illustrating the power seat slide apparatus according to the first embodiment.

As illustrated in FIGS. 2 and 3, the power seat slide apparatus 12 mainly includes left and right lower rails 21, left and right upper rails 22, left and right screw shafts 23, left and right feeding nuts 24 and a driving unit 25. Hereinafter, only the left side components are described as an example of each of the left and right side components unless otherwise indicated.

Figure 4:
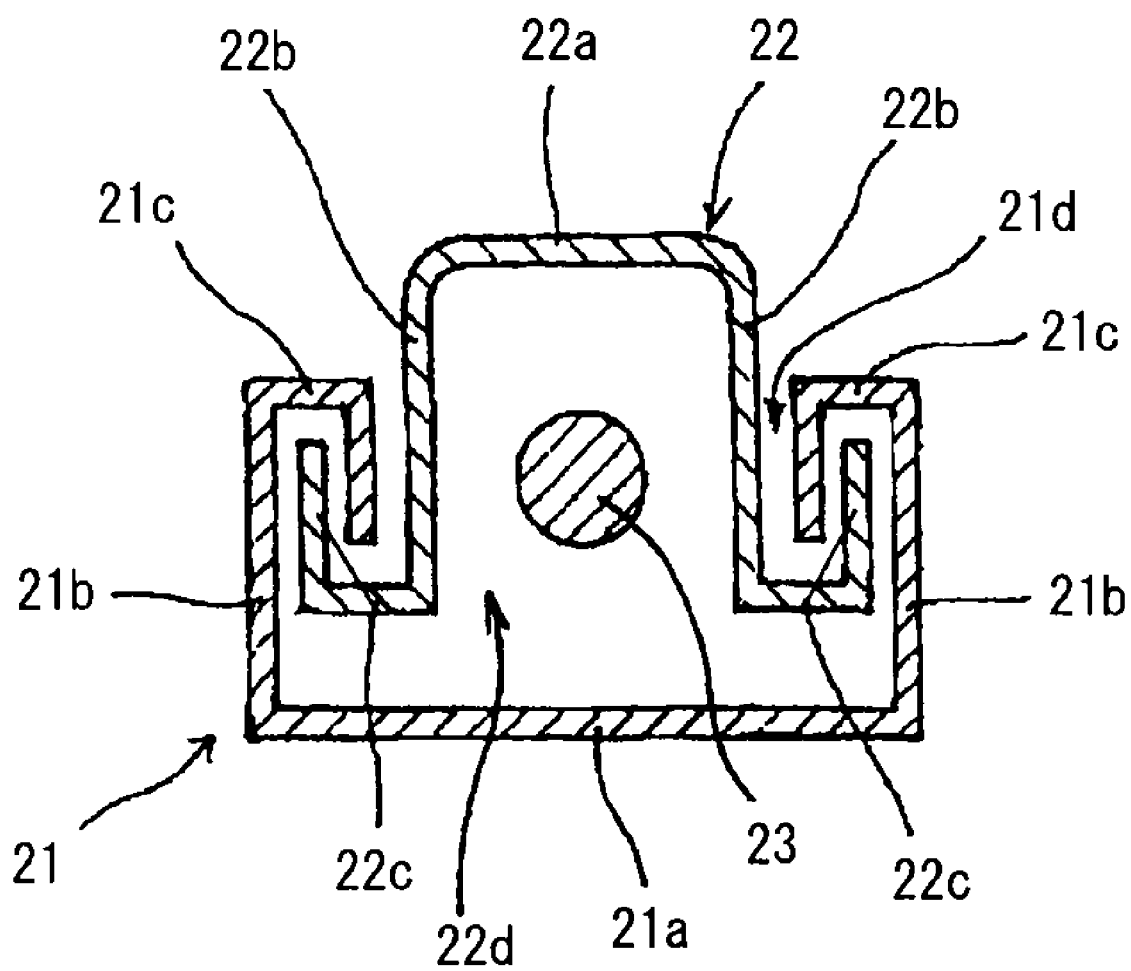
FIG. 4 is a cross sectional view, illustrating the power seat slide apparatus according to the first embodiment, taken along line IV-IV in FIG. 2.

The lower rail 21 (serving as a fixture member) is an elongated member extending in the forward and backward direction of the seat 10. The left and right lower rails 21 are adapted to be disposed on the vehicle floor 11 so as to be parallel with each other in the width direction of the seat 10. As illustrated in FIG. 4, the lower rail 21 includes a bottom wall 21a, a pair of side walls 21b (left and right side walls), and a pair of flange walls 21c (left and right flange walls). The left and right side walls 21b upwardly extend from left and right end portions of the bottom wall 21a, respectively. Upper end portions of the left and right side walls 21b are bent towards an inner side of the lower rail 21 and then in a lower direction thereof so as to extend towards the bottom wall 21a, respectively, thus forming the left and right flange walls 21c. An opening portion 21d is formed between the left and right flange walls 21c. Thus, the lower rail 21 is formed to have an approximately U-shaped cross section. Front and rear end portions of the lower rail 21 are adapted to be connected to the vehicle floor 11 by means of connecting members, such as bolts, thereby fixing the lower rail 21 to the vehicle floor 11.

Further, as illustrated in FIG. 3, the upper rail 22 (serving as a movable member) is an elongated member extending in the forward and backward direction of the seat 10. The left and right upper rails 22 are adapted to be assembled onto the left and right lower rails 21, respectively, so as to be parallel with each other. As illustrated in FIG. 4, the upper rail 22 includes an upper wall 22a, a pair of side walls 22b (left and right side walls) and a pair of flange walls 22c (left and right flange walls). The left and right side walls 22b downwardly extend from left and right end portions of the upper wall 22a, respectively. Lower end portions of the left and right side walls 22b are bent towards an outer side of the upper rail 22 and then in an upper direction, respectively, thus forming the left and right flange walls 22c. An opening portion 22d is formed between the left and right side walls 22b. Thus, the upper rail 22 is formed to have an approximately inverted U-shaped cross section. The left and right side walls 22b of the upper rail 22 are slidably engaged with the left and right side walls 21b of the lower rail 21, respectively. Front and rear end portions of the upper rail 22 are adapted to be connected to the seat cushion 13 via brackets 27 (see FIG. 2), respectively, thereby fixing the upper rail 22 to the seat cushion 13.

Figure 5:
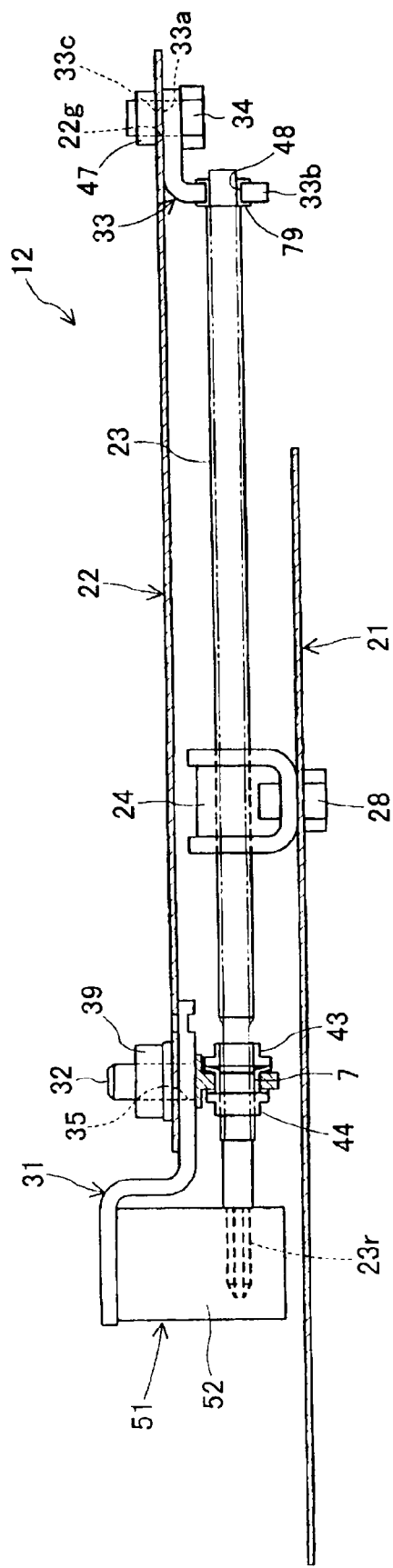
FIG. 5 is a longitudinal cross sectional view, illustrating the power seat slide apparatus according to the first embodiment, taken along a longitudinal direction of an upper rail and a lower rail of the power seat slide apparatus.
Figure 6:
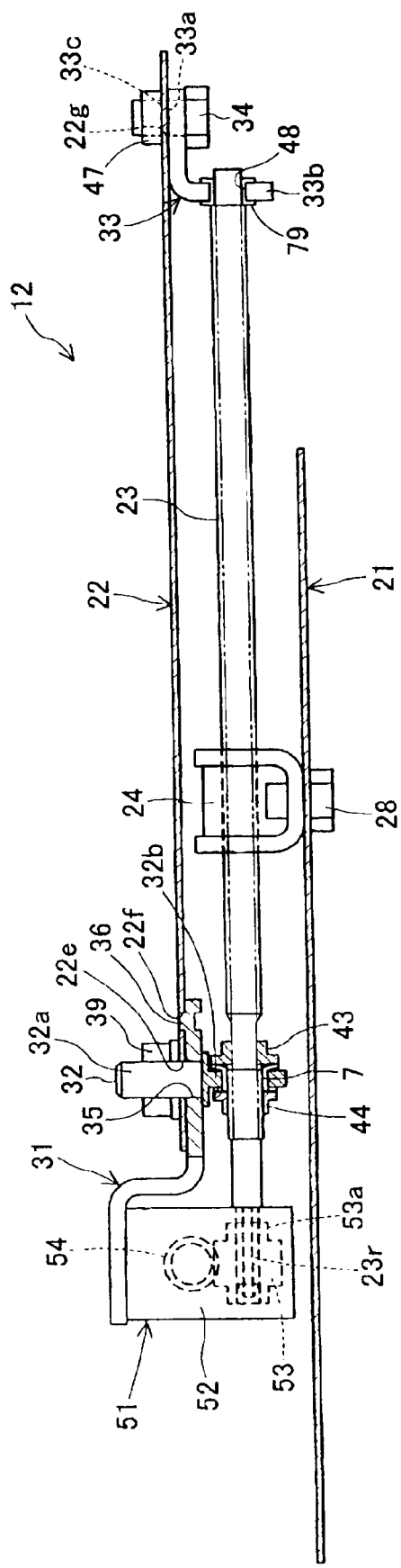
FIG. 6 is a longitudinal cross sectional view, illustrating the power seat slide apparatus according to the first embodiment, taken along an axial direction of a screw shaft of the power seat slide apparatus.
Figure 7:
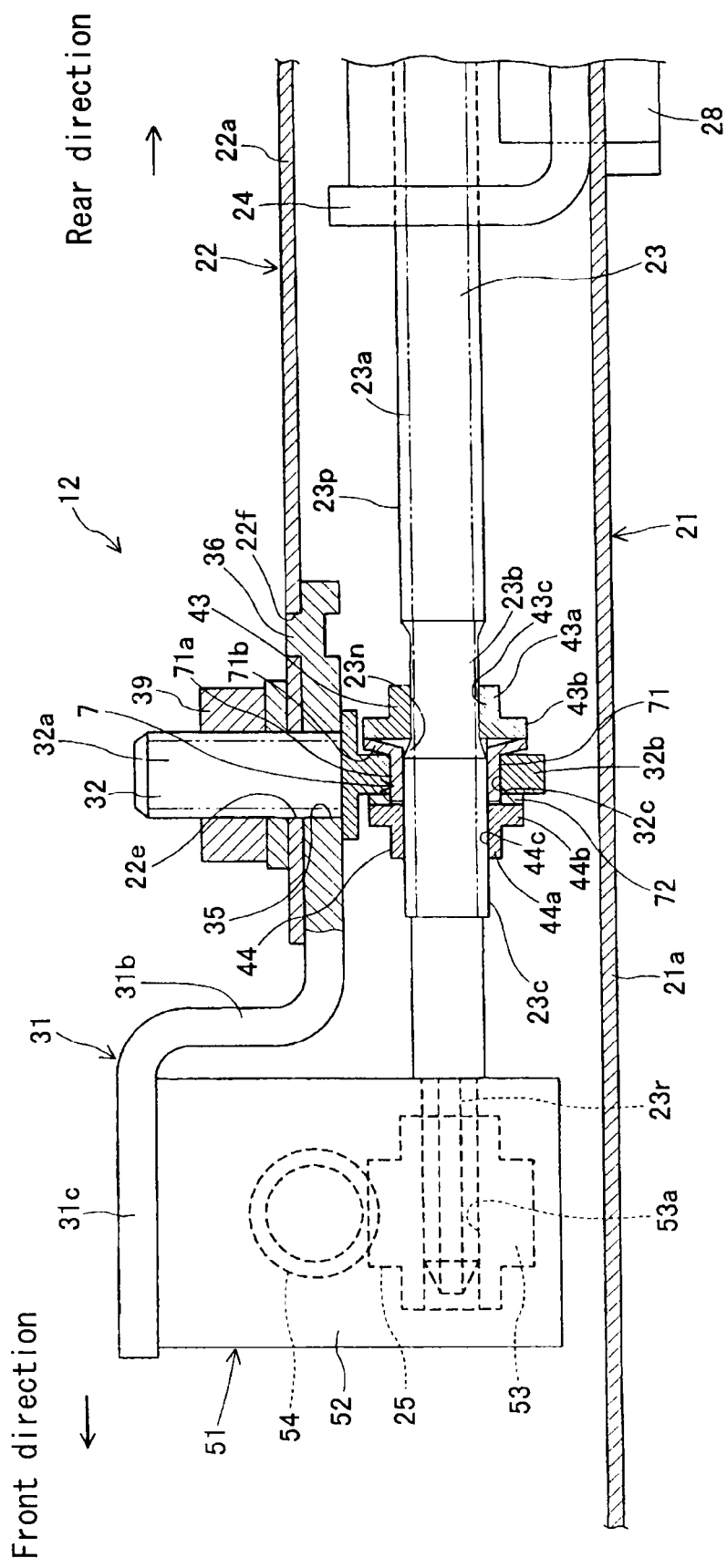
FIG. 7 is an enlarged cross sectional view of FIG. 6.

As illustrated in FIGS. 5 to 7, the screw shaft 23 is provided between the lower rail 21 and the upper rail 22 so as to extend in the forward and backward direction of the seat 10. In other words, an axial direction of the screw shaft 23 (a moving direction of the screw shaft) corresponds to the forward and backward direction of the seat 10. As illustrated in FIG. 7, the screw shaft 23 includes an external thread portion 23p at an outer circumferential surface thereof. The external thread portion 23p includes a rear screw portion (a lead screw) 23a, a partial screw portion 23b (incomplete screw portion) and a front screw portion 23c. The rear screw portion 23a is formed at a rear side portion of the external thread portion 23p and is threaded in a first rotational direction. The partial screw portion 23b is formed at a portion being further forward than the rear screw portion 23a. The front screw portion 23c is formed at a portion being further forward than the partial screw portion 23b and is threaded in a second rotational direction (in an inverse direction of the first rotational direction). The rear screw portion 23a and the front screw portion 23c may be threaded in the same direction with each other.

The rear screw portion 23a of the screw shaft 23 serves as a feeding screw portion. The feeding nut 24, which is fixedly connected to the bottom wall 21a of the lower rail 21 by means of a bolt 28, is screwed onto the rear screw portion 23a of the screw shaft 23. A fixing nut 43 is fixedly connected to the partial screw portion 23b of the screw shaft 23. The front screw portion 23c of the screw shaft 23 serves as a connecting screw portion. More specifically, a connecting nut 44 (described below) is fixedly connected to the front screw portion 23c. Further, the front screw portion 23c is supported by a bearing hole 32c of a bolt 32 via an intermediate member 7 along with the fixing nut 43. The front end portion and a rear end portion of the screw shaft 23 are supported by the upper rail 22 so as to be rotatable only. Accordingly, when the screw shaft 23 is operated to rotate, the upper rail 22 slides on the lower rail 21 in the forward and backward direction of the seat 10 along with the screw shaft 23. Hereinafter, a structure of the driving unit 25 and a structure for supporting the screw shaft 23 to the upper rail 22' will be described in detail.

As illustrated in FIGS. 5 to 7, a front supporting bracket (serving as a supporting member) 31 is connected to the front end portion of the upper rail 22 by means of the bolt 23. Further, a rear supporting bracket 33 is connected to the rear end portion of the upper rail 22 by means of a bolt 34.

The front supporting bracket 31 is made from a plate member. As illustrated in FIG. 6, a bolt hole 35 is defined at a central portion of the front supporting bracket 31. An extending portion 32a of the bolt 32 is inserted through the bolt hole 35. Further, a positioning protrusion 36 is formed at a rear end portion of the front supporting bracket 31. On the other hand, a bolt hole 22e and a positioning hole 22f are formed at a front end portion of the upper wall 22a of the upper rail 22, onto which the front supporting bracket 31 is assembled. The extending portion 32a of the bolt 32 is inserted through the bolt hole 22e of the upper rail 22. Further, the positioning protrusion 36 of the front supporting bracket 31 fits into the positioning hole 22f of the upper rail 22. The extending portion 32a of the bolt 32 is inserted through the bolt hole 35 of the front supporting bracket 31 and the bolt hole 22e of the upper rail 22 in a condition where the positioning protrusion 36 of the front supporting bracket 31 fits into the positioning hole 22f of the upper rail 22. Then, a nut 39 is screwed onto the extending portion 32a of the bolt 32. Thus, the front supporting bracket 31 is fixed to the upper rail 22.

As illustrated in FIG. 7, a supporting portion 32b is formed at a lower portion of the bolt 32 so as to protrude therefrom. The supporting portion 32b is fixedly connected to the front supporting bracket 31 so as to be integral therewith. Thus, the supporting portion 32b (the bolt 32) structures a part of the front supporting bracket 31. The supporting portion 32b may be integrally formed at the front supporting bracket 31. The supporting portion 32b is disposed between the front supporting bracket 31 and the lower rail 21. The bearing hole 32c is formed at the supporting portion 32b of the bolt 32. A diameter of the bearing hole 32c is arranged to be slightly larger than a diameter of the screw shaft 23. The screw shaft 23 is inserted through the bearing hole 32c formed at the bolt 32 via the intermediate member 7. More specifically, the intermediate member 7 is provided at a clearance defined between the screw shaft 23 and an inner circumferential wall of the bearing hole 32c formed at the supporting portion 32b of the bolt 32.

The fixing nut (serving as a thrust receiving member) 43 is provided at a rear side of the supporting portion 32b of the bolt 32 in the axial direction (serving as a thrust direction), while the connecting nut 44 is provided at a front side of the supporting portion 32b. More specifically, the fixing nut 43 and the connecting nut 44 are disposed in the axial direction of the screw shaft 23 so as to face each other, while the bolt 32 fixedly connected to the supporting bracket 31 is disposed between the fixing nut 43 and the connecting nut 44.

A flange nut is employed as the fixing nut 43, for example. The fixing nut 43 includes an extending portion 43a, a flange portion 43b and an internal thread portion 43c. The extending portion 43a of the fixing nut 43 extends in the axial direction of the screw shaft 23. The flange portion 43b is formed at a front side of the extending portion 43a and is disposed at a rear side of the supporting portion 32b of the bolt 32. A diameter of the flange portion 43b is formed to be larger than a diameter of the extending portion 43a. The inner thread portion 43c is sequentially formed through the extending portion 43a and the flange portion 43b in the axial direction of the screw shaft 23. The fixing nut 43 is fixedly tightened to a raising portion 23n formed at the partial screw portion 23b of the screw shaft 23 through the internal thread portion 43c. The flange portion 43b of the fixing nut 43 elastically presses an elastic protruding collar portion 71b of the intermediate member 7 towards a rear end surface of the supporting portion 32b.

A flange nut is employed as the connecting nut 44, for example. The connecting nut 44 includes an extending portion 44a, a flange portion 44b and an internal thread portion 44c. The extending portion 44a extends in the axial direction of the screw shaft 23. The flange portion 44b is formed at a rear side of the extending portion 44a and is disposed at a front side of the supporting portion 32b of the bolt 32. A diameter of the flange portion 44b is formed to be larger than a diameter of the extending portion 44a. The internal thread portion 44c is sequentially formed through the extending portion 44a and the flange portion 44b in the axial direction of the screw shaft 23. The connecting nut 44 is screwed onto the front screw portion 23c of the screw shaft 23 through the internal thread portion 44c.

The intermediate member 7 is provided between the supporting portion 32b of the bolt 32 and the screw shaft 23 and between the fixing nut 43 and the connecting nut 44. More specifically, the intermediate member 7 is structured with a bush 71 and a plane washer 72, which have a high sliding ability. The bush 71 is made from a resin material or a metallic material, for example. The bush 71 includes a cylindrical portion 71a, which has a shaft bore, and the elastic protruding collar portion (serving as an elastic thrust portion) 71b, which is formed at a rear end of the cylindrical portion 71a. The cylindrical portion 71a is formed in a cylindrical shape extending in the axial direction of the screw shaft 23. Further, the cylindrical portion 71a is disposed inside the bearing hole 32c formed at the bolt 32. The screw shaft 23 is inserted through the shaft bore of the cylindrical portion 71a of the intermediate member 7. An inner circumferential surface of the cylindrical portion 71a is compressed to contact the external thread portion 23p formed at the outer circumferential surface of the screw shaft 23. An external circumferential surface of the cylindrical portion 71a (serving as a radial sliding contact surface) slidably and rotatably fits the inner circumferential surface of the bearing hole 32c (serving as a radial bearing surface). The elastic protruding collar portion 71b structures the elastic thrust portion of the intermediate member 7. More specifically, the elastic protruding collar portion 71b extends radially outwardly and slightly inclines, from a radially inward portion to a radially outward portion thereof, in the axially backward direction of the screw shaft 23. Thus, the elastic protruding collar portion 71b of the sliding contact portion 71 includes a form of a disc spring which is elastically deformable in the axial direction of the screw shaft 23. The elastic protruding collar portion 71b is disposed between the supporting portion 32b of the bolt 32 and the flange portion 43b of the fixing nut 43. A front end surface of the elastic protruding collar portion 71b (serving as a first thrust sliding contact surface) elastically contacts a rear end surface of the supporting portion 32b (serving as a first/second thrust bearing surface) of the bolt 32. A rear end surface of the elastic protruding collar portion 71b elastically contacts a front end surface of the flange portion 43b. Accordingly, the elastic protruding collar portion 71b is an elastic member, which is elastically deformed in the axial direction of the screw shaft 23 when the elastic protruding collar portion 71b is pressed in the axially forward direction of the screw shaft 23 by the flange portion 43b of the fixing nut 43.

The plane washer (serving as a thrust portion) 72 of the intermediate member 7 is made from a metallic material, for example. The plane washer 72 includes a shaft hole at a central portion thereof. Further, an outer diameter of the plane washer 72 is formed to be equal to or slightly smaller than a diameter of the elastic protruding collar portion 71b of the bush 71. Further, the plane washer 72 is formed sequentially in a circumferential direction thereof, i.e., formed in a disc-shape. According to the first embodiment, the plane washer 72 is hardly elastically deformed in the axial direction of the screw shaft 23. An inner circumferential surface forming the shaft hole of the plane washer 72 contacts an outer circumferential surface of a front end portion of the cylindrical portion 71a of the bush 71. The plane washer 72 is disposed between the supporting portion 32b of the bolt 32 and the flange portion 44b of the connecting nut 44. Further, the plane washer 72 is supported by a rear end surface of the flange portion 44b by being in contact therewith, so that the flange portion 44b slidably contacts the front end surface of the supporting portion 32b of the bolt 32. In other words, a rear end surface of the plane washer 72 (serving as a second thrust sliding contact surface) slidably contacts the front end surface of the supporting portion 32b (serving as a second thrust bearing portion) of the bolt 32.

The elastic protruding collar portion 71b of the bush 71 and the connecting nut 44 structure an elastic biasing mechanism. The connecting nut 44 is connected to the front screw portion 23c of the screw shaft 23. Accordingly, the elastic protruding collar portion 71b of the bush 71 is elastically deformed so that the front end surface of the elastic protruding collar portion 71b elastically contacts the rear end surface of the supporting portion 32b of the bolt 32, and the rear end surface of the elastic protruding collar portion 71b elastically contacts the front end surface of the flange portion 43b of the fixing nut 43. Thus, the intermediate member 7 is axially elastically biased towards the fixing nut 43. Accordingly, the intermediate member 7 and the fixing nut 43 are assembled onto the screw shaft 23 without a clearance between the intermediate member 7 and the fixing nut 43.

The screw shaft 23, which is structured integrally with the fixing nut 43 and the connecting nut 44, is supported by the front supporting bracket 31 in a radial direction and in the thrust direction so as to be slidable via the intermediate member 7.

A front end of the front supporting bracket 31 is bent upwardly at the front portion of the upper rail 22, thereby forming a vertical bent portion 31b. Further, an end portion (an upper end) of the vertical bent portion 31b is bent approximately vertically in the front direction, thereby forming a horizontal supporting portion 31c extending horizontally in the front direction. A gear box 51 is fixedly connected to a lower surface of the horizontal supporting portion 31 by means of an appropriate connecting member, such as a bolt, for example.

As illustrated in FIG. 5, the rear supporting bracket 33 is formed in an L-shape so as to have a horizontal portion 33a and a vertical portion 33b. Further, a bolt hole 33c is formed at the horizontal portion 33a, so that a bolt 34 is inserted through the bolt hole 33c. On the other hand, a bolt hole 22g is formed at a rear end portion of the upper rail 22, at which the rear supporting bracket 33 is assembled, so that the bolt 34 is also inserted through the bolt hole 22g formed at the upper rail 22. More specifically, the bolt 34 is inserted through the bolt hole 33c of the rear supporting bracket 33 and the bolt hole 22g of the upper rail 22, and a nut 47 is screwed onto the bolt 34, thereby integrally assembling the rear supporting bracket 33 onto the upper rail 22.

A through hole 48 is formed at the vertical portion 33b of the rear supporting bracket 33, so that the screw shaft 23 is inserted through the through hole 48. A bush 79 is assembled onto the through hole 48. A cross sectional shape of the bush 79 includes a substantially U-shape. A rear shaft end portion of the screw shaft 23 is rotatably supported by the bush 79. Accordingly, the screw shaft 23, to which the feeding nut 24 is screwed, is rotatably supported by the bush 71 provided at the front end portion of the screw shaft 23 and by the bush 79 provided at the rear end portion of the screw shaft 23.

The gear box 51, which is fixedly connected to the lower surface of the front end portion (the horizontal portion 31a) of the front supporting bracket 3, includes a housing 52. As illustrated in FIG. 7, a worm wheel 53 (an output rotational portion) is rotatably supported by the housing 52 so as to be coaxial with the screw shaft 23. A spline hole 53a is formed at a rotational center of the worm wheel 53, while a spline engagement portion 23r is formed at the front end portion of the screw shaft 23. The spline engagement portion 23r of the screw shaft 23 and the spline hole 53a of the worm wheel 53 are engaged with each other. Further, a worm formed at a worm shaft 54 is engaged with the worm wheel 53. The worm shaft 54 is supported by the housing 52 so as to be rotatable about a rotational axis which is orthogonal to a rotational axis of the worm wheel 53, i.e., so as to be rotatable about a horizontal axis which is orthogonal to the forward and backward direction of the vehicle. The worm wheel 53 and the worm shaft 54 structure a reduction gear mechanism.

As illustrated in FIGS. 3 and 7, a rotation transmitting shaft 55 extending in the lateral direction of the seat 10 is disposed between the left and right gear boxes 51. One end of the rotation transmitting shaft 55 is connected to the left worm shaft 54 supported by the left gear box 51, while another end of the rotation transmitting shaft 55 is connected to the right worm shaft 54 supported by the right gear box 51. An output shaft of a motor 57 is rotatably connected to the rotation transmitting shaft 55 via a gear mechanism. A rotation of the motor 57 is transmitted to the left and right worm shafts 54 via the rotation transmitting shaft 55.

The worm wheel 53 rotates by a rotation of the worm shaft 54, so that the rotation of the motor 57 is reduced by the worm formed at the worm shaft 54 and the worm wheel 53. Further, the rotation of the worm wheel 53 is transmitted to the screw shaft 23 which is spline-engaged with the worm wheel 53. Accordingly, the left and right screw shafts 23 are operated to synchronously rotate, thereby slidably moving the left and right upper rails 22, in which the left and right screw shafts 23 are supported respectively, relative to the corresponding left and right lower rails 22. The motor 57, the rotation transmitting shaft 55 and the reduction gear mechanism (the worm shaft 54 and the worm wheel 53) structure the driving unit 25.

When relatively rotatably assembling the screw shaft 23 onto the bolt 32, first, the fixing nut 43 is screwed onto the screw shaft 23 from the rear side of the screw shaft 23 to the partial screw portion 23b. The internal thread portion 43c of the fixing nut 43 is plastically deformed at the raising portion 23n formed at a rear side of the front screw portion 23c of the partial thread portion 23b. Accordingly, the fixing nut 43 is firmly fixed to the screw shaft 23.

Next, the screw shaft 23 is inserted through the shaft bore formed at the bush 71 from a front portion of the screw shaft 23, and the elastic protruding collar portion 71b of the bush 71 is arranged to elastically contact the front end surface of the flange portion 43b of the fixing nut 43. Then, the bush 71 and the screw shaft 23 are inserted through the bearing hole 32c of the bolt 32 from the front portion of the screw shaft 23, and the outer circumferential surface of the cylindrical portion 71a of the bush 71 is arranged to contact the supporting portion 32b of the bolt 32. Further, the rear end surface of the supporting portion 32b is arranged to slidably contact the elastic protruding collar portion 71b of the bush 71. Next, the plane washer 72 is assembled onto the screw shaft 23 from the front side of the screw shaft 23 and the bush 71 so that the screw shaft 23 is inserted through the shaft bore of the plane washer 72. The rear end surface of the plane washer 72 is arranged to slidably contact the front end surface of the supporting portion 32b of the bolt 32. Then, the connecting nut 44 is screwed onto the front screw portion 23c of the screw shaft 23 from the front side of the screw shaft 23 and is tightened thereat. At this time, the connecting nut 44 is tightened in a condition where the elastic protruding collar portion 71b of the bush 71 is axially elastically deformed with a tightening torque with which the connecting nut 44 is prevented from loosening even when the screw shaft 23 is driven to rotate, i.e., with a tightening torque being larger than a rotational torque of the screw shaft 23. Accordingly, the flange portion 44b of the connecting nut 44 presses the front end surface of the cylindrical portion 71a of the bush 71, and the elastic protruding collar portion 71b is accordingly elastically deformed in the axial direction of the screw shaft 23 so as to elastically contact the flange portion 43b of the fixing nut 43. Thus, the screw shaft 23 and the bolt 32 are assembled so that the screw shaft 23 is rotatable relative to the bolt 32.

Next, an operation of the power seat slide apparatus 12 according to the first embodiment will be described hereinbelow. When moving the seat 10 in the forward and backward direction, a switch, which is provided in the vicinity of the vehicle seat 10 for forwardly or backwardly moving the vehicle seat 10, is operated, so that the motor 57 is actuated to rotate in a first rotational direction or in a second rotational direction thereof. Accordingly, the rotation transmitting shaft 55 is driven to rotate in a first rotational direction or in a second rotational direction thereof (an inverted rotational direction of the first rotational direction), and the rotation of the rotation transmitting shaft 55 is transmitted to each of the left and right worm shafts 54 housed in the corresponding left and right gear boxes 51. Thus, the left and right worm wheels 53 (each serving as an output rotational member) are operated to rotate by the rotation of the corresponding left and right worm shafts 54. The rotation of each worm wheel 53 is transmitted to the corresponding screw shaft 23 via the spline engagement portion 23r formed at the screw shaft 23. As a consequence, the screw shaft 23 is operated to rotate by the rotation transmitting shaft 55 driven by the motor 57 via the reduction gear mechanism structured with the worm shaft 54 and the worm wheel 53.

Because the feeding nut 24 fixedly connected to the lower rail 21 is screwed onto the screw shaft 23, the screw shaft 23 rotates to move in the axial direction relative to the feeding nut 24. Accordingly, the upper rail 22 is operated to move in the forward direction or in the backward direction via the front supporting bracket 31 and the rear supporting bracket 33, which rotatably supports the screw shaft 23, thereby adjusting a longitudinal position of the vehicle seat 10.

When the screw shaft 23 rotates, the fixing nut 43 and the connecting nut 44 which are fixedly connected to the screw shaft 23, and the intermediate member 7 are operated to rotate along with the screw shaft 23. Accordingly, the intermediate member 7 slidably rotates in accordance with the rotation of the screw shaft 23 relative to the supporting portion 32b of the bolt 32.

According to the first embodiment, the intermediate member 7 structured with the bush 71 and the plane washer 72 is disposed between the screw shaft 23 and the supporting portion 32b of the bolt 32 which is provided integrally with the front supporting bracket 31. The bush 71 and the plane washer 72 are supported by the screw shaft 23 so as to be slidably rotatable relative to the supporting portion 32b of the bolt 32. The outer circumferential surface of the cylindrical portion 71a of the bush 71 slidably contacts the inner circumferential surface of the bearing hole 32c formed at the supporting portion 32b, and the rear end surface of the elastic protruding collar portion 71b of the bush 71 slidably contacts the front end surface of the fixing nut 43. Further, the front end surface of the plane washer 72 slidably contacts the rear end surface of the connecting nut 44. Accordingly, the intermediate member 7 structured with the bush 71 and the plane washer 72 smoothly slidably rotates relative to the supporting portion 32b of the bolt 32.

The front end surface of the elastic protruding collar portion 71b of the bush 71 elastically contacts the rear end surface of the supporting portion 32b of the bolt 32 by the elastic force of the elastic protruding collar portion 71b. In addition, because the rear end surface of the elastic protruding collar portion 71b elastically contacts the fixing nut 43 provided at the screw shaft 23, the front end surface of the elastic protruding collar portion 71b is elastically pressed in the axial direction to the rear end surface of the supporting portion 32b of the bolt 32. Accordingly, the bush 71 and the fixing nut 43 are provided on the screw shaft 23 without a clearance between the elastic protruding collar portion 71b of the bush 71 and the fixing nut 43, thereby tolerating a dimensional error, an assembling error, and the like, between the screw shaft 23 and the fixing nut 43. Thus, the bush 71 smoothly slidably rotates relative to the supporting portion 32b of the bolt 32, and errors such as the dimensional error and the assembling error between the fixing nut 43 and the connecting nut 44, which are fixedly connected to the screw shaft 23, are tolerated by an elastic force acting in the axial direction of the screw shaft 23. Accordingly, the screw shaft 23 smoothly rotates relative to the supporting portion 32b of the bolt 32.

The outer circumferential surface of the cylindrical portion 71a of the bush 71 is slidably supported relative to the bolt 32. Thus, the screw shaft 23 is stably supported by the outer circumferential surface of the cylindrical portion 71a of the bush 71.

Further, the intermediate member 7 is provided between the supporting portion 32b of the bolt 32 and the screw shaft 23 and between the fixing nut 43 and the connecting nut 44. Accordingly, the intermediate member 7 is stably supported by the bolt 32, the fixing nut 34 and the connecting nut 44 so as to allow the screw shaft 23 to smoothly rotate.

Further, the connecting nut 44 is tightened to the screw shaft 23 in the condition where the elastic protruding collar portion 71b of the bush 71 is axially elastically deformed with the tightening torque with which the connecting nut 44 is prevented from loosening even when the screw shaft 23 is driven to rotate, i.e., with the tightening torque being larger than the rotational torque of the screw shaft 23. Accordingly, the connecting nut 44 is surely fixed to the screw shaft 23 so as not to loosen.

Further, the fixing nut 43 and the connecting nut 44 are connected to the partial screw portion 23b and the front screw portion 23c of the screw shaft 23, respectively. Accordingly, the fixing nut 43 and the connecting nut 44 are fixedly connected to the screw shaft 23 without executing a compressing process, in which end portions of nuts are compressed to connect the nuts onto the screw shaft 23 in a condition where the nuts are screwed onto the screw shaft 23 as in the conventional manner. Therefore, the screw shaft 23 does not receive a large load to be generated due to such compressing process. Thus, the screw shaft 23 is prevented from deforming and is allowed to rotate smoothly.

According to the first embodiment, the elastic protruding collar portion 71b of the bush 71, which is an elastic deformable member, is provided at the axially rear side of the supporting portion 32b of the bolt 32. However, such elastic deformable member such as an elastic washer may be also provided at the axially front side of the bolt 32, i.e., the elastic deformable members may be provided at both front and rear sides of the bolt 32, respectively. Herein, any washer, such as a wave washer, a cone disc washer, a plastic washer, a rubber washer, an elastic foam washer, a spring washer, or the like, may be employed as such elastic washer as long as it is elastically deformable in the axial direction of the screw shaft 23. By providing such elastic washer between the supporting portion 32b of the bolt 32 and the connecting nut 44, the dimensional error between the supporting portion 32b and the connecting nut 44 may be effectively tolerated by the elasticity of the elastic washer in the axial direction, and the screw shaft 23 may be operated to smoothly rotate relative to the supporting portion 32b.

Figure 8:
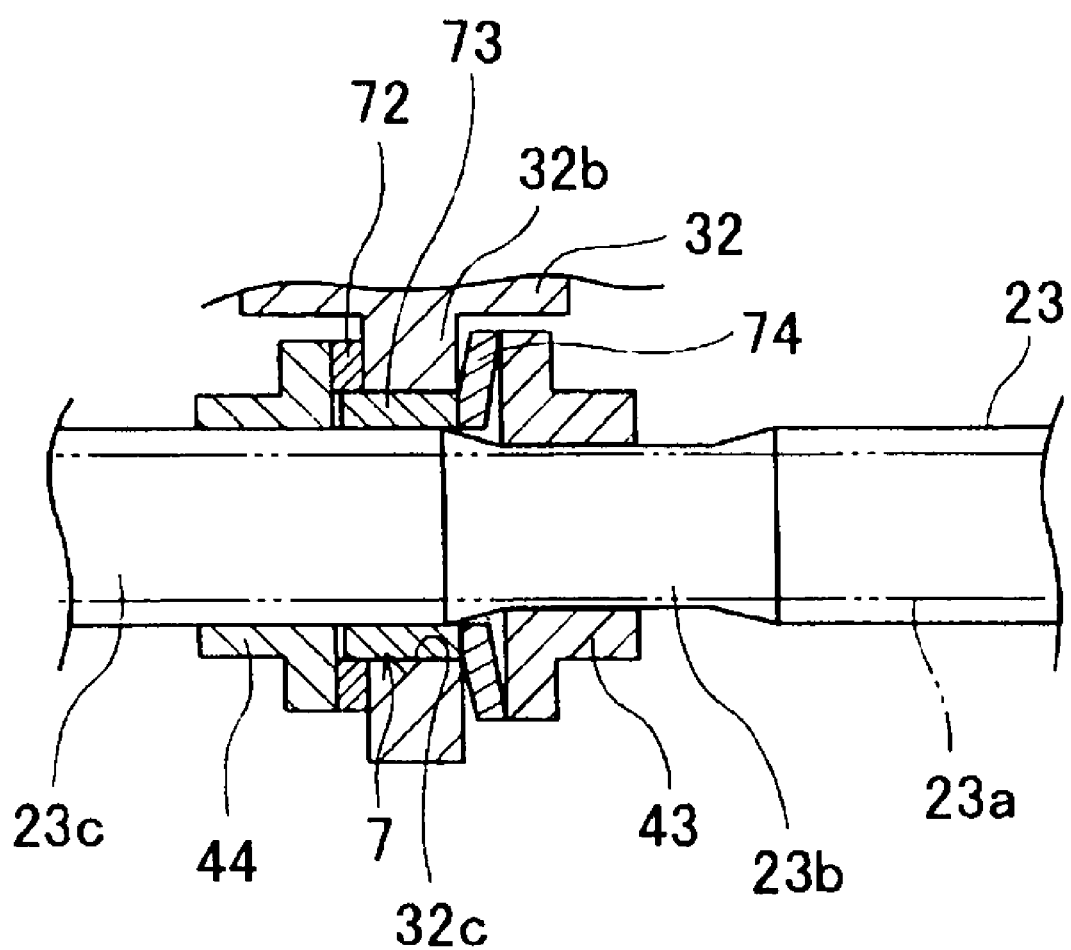
FIG. 8 is an enlarged cross sectional view partially illustrating the power seat slide apparatus according to the second embodiment.

According to a second embodiment, as illustrated in FIG. 8, the intermediate member 7 includes a cylindrical collar portion (serving as a radial portion) 73 and an elastic washer (serving as the elastic thrust portion) 74 in place of the bush 71. The cylindrical collar portion 73 does not include a radial protruding portion such as the protruding collar portion of the elastic protruding collar portion 71b according to the first embodiment. The cylindrical collar portion 73 and the elastic washer 74 have high sliding ability. The cylindrical collar portion 73 may be made from a metallic material or a resin material, for example. Any washer, such as a wave washer, a cone-disc washer, a spring washer, a rubber washer, a plastic washer, a foam washer, or the like, may be employed as the elastic washer 74 as long as it is elastically deformable in the axial direction of the screw shaft 23.

The cylindrical collar portion 73 fits the front screw portion 23c of the screw shaft 23. An outer circumferential surface of the cylindrical collar portion 73 (serving as the radial sliding contact surface) slidably contacts the inner circumferential surface of the bearing shaft 32c formed at the supporting portion 32b of the bolt 32. The elastic washer 74 is formed in an annular shape so that a radially outer portion and a radially inner portion thereof are elastically deformable in the axial direction of the screw shaft 23. A front end surface of the elastic washer 74 (serving as the first/second thrust sliding contact surface) slidably contacts the rear end surface of the supporting portion 32b of the bolt 32. The plane washer (serving as the thrust portion) 72 is provided between the front end surface of the supporting portion 32b of the bolt 32 and the rear end surface of the connecting nut 44. The rear end surface of the plane washer 72 (serving as the first/second thrust sliding contact surface) slidably contacts the front end surface of the supporting portion 32b of the bolt 32.

The elastic washer 74 and the connecting nut 44 structure the elastic biasing mechanism. More specifically, because the connecting nut 44 is connected to the front screw portion 23c of the screw shaft 23 by being tightened thereto so as to elastically deform the elastic washer 74, the elastic washer 74 is elastically biased towards the rear end surface of the supporting portion 32b of the bolt 32, and the elastic washer 74 and the cylindrical collar portion 73 are elastically pressed to the fixing nut 43. Accordingly, errors such as the dimensional error and the assembling error between the screw shaft 23 and the fixing nut 43 are tolerated.

According to the second embodiment, because the intermediate member 7 elastically deforms in the axial direction, the dimensional error between the fixing nut 43 and the connecting nut 44 is tolerated. Accordingly, the screw shaft 23 is allowed to smoothly rotate relative to the front supporting bracket 31.

Figure 9:
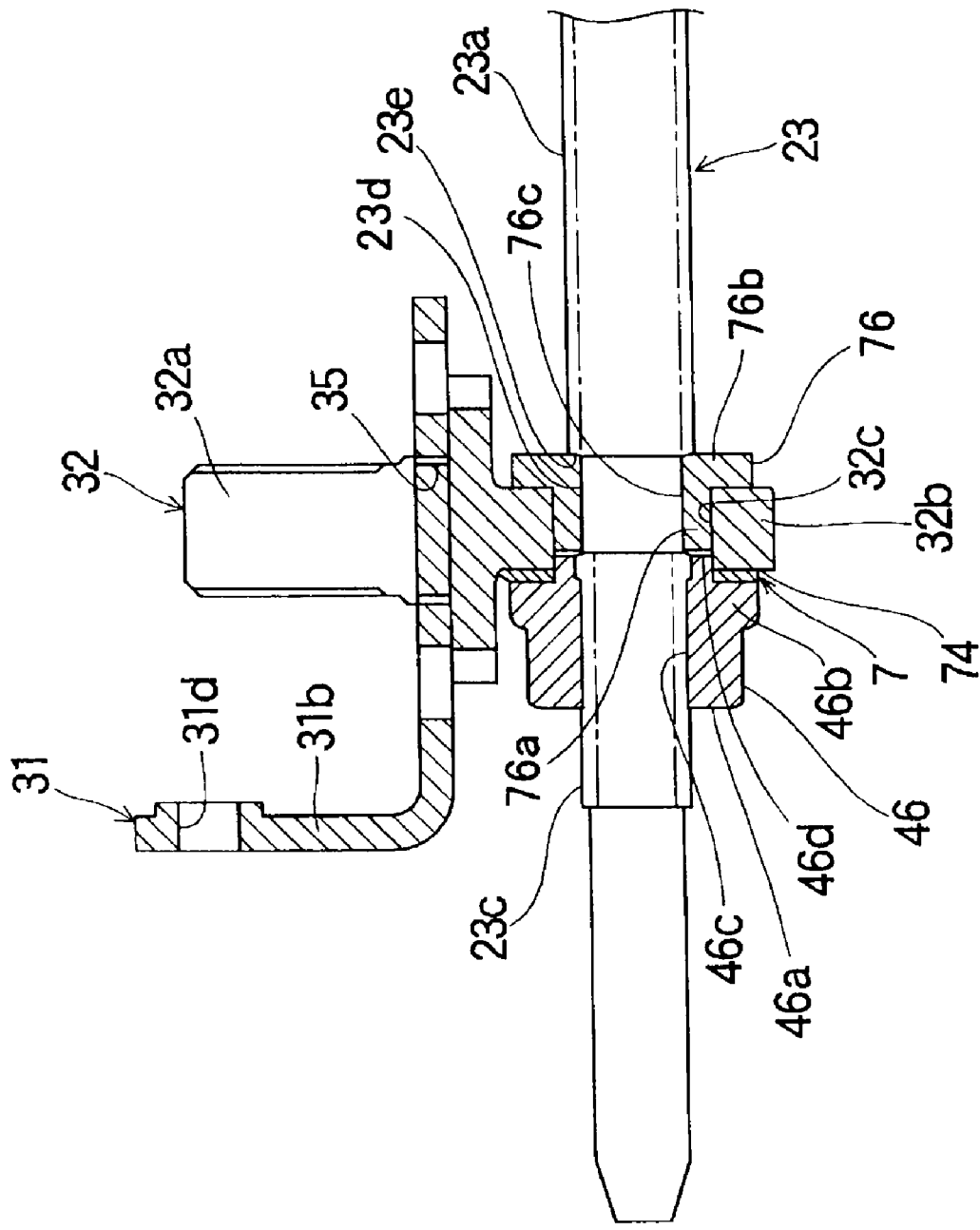
FIG. 9 is an enlarged cross sectional view partially illustrating the power seat slide apparatus according to the third embodiment.
Figure 10:
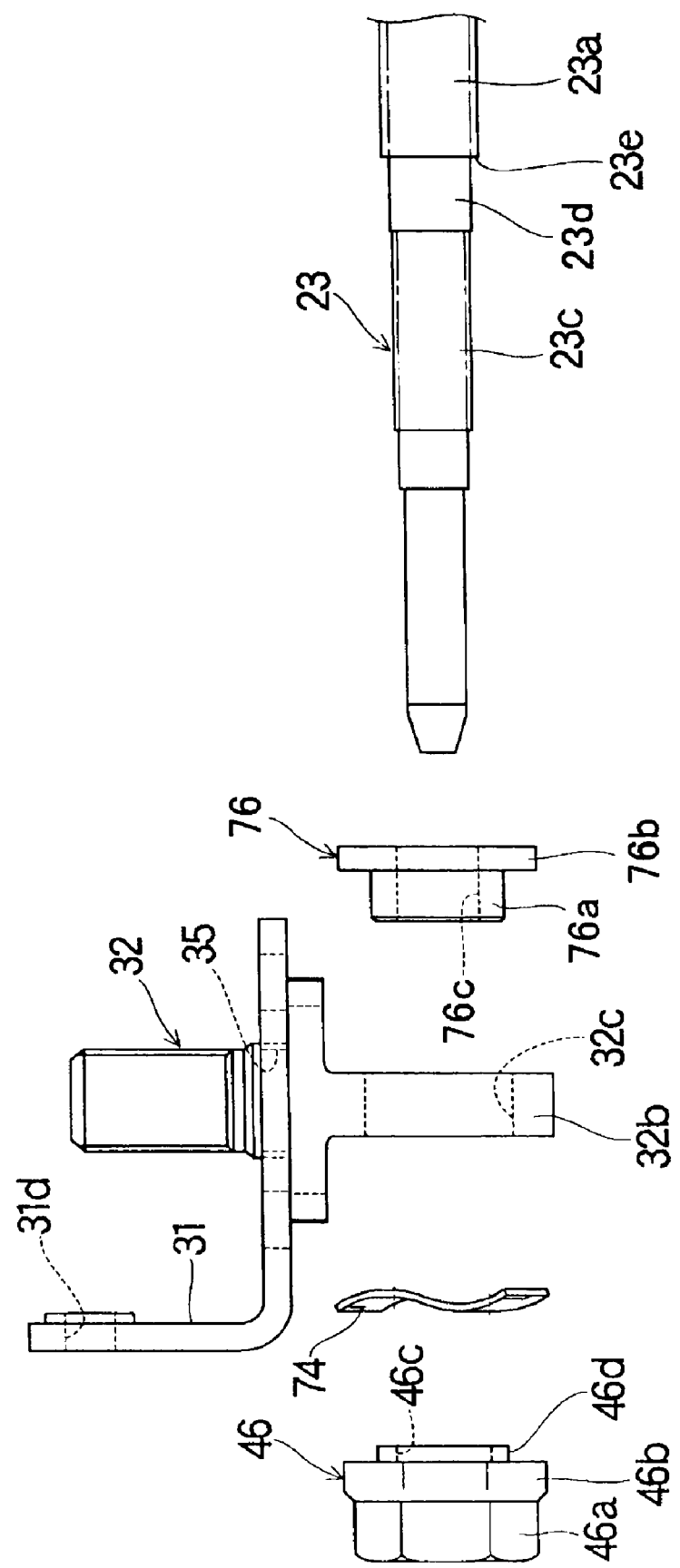
FIG. 10 is an exploded front view partially illustrating the power seat slide apparatus according to the third embodiment.

According to a third embodiment, as illustrated in FIGS. 9 and 10, the intermediate member 7 is structured with a sliding contact bush (serving as the thrust receiving member) 76 and the elastic washer (serving as the elastic thrust member) 74 which functions as the elastic member. Further, a fixing nut, such as the fixing nut 43 employed in the first embodiment, is not provided. Alternatively, being different from the first embodiment, the sliding contact bush 76 is pressed to a step portion 23e, which protrudes from the screw shaft 23, so as to be fixed thereto by a connecting nut 46. Hereinafter, differences between the first and third embodiments will be mainly described.

According to the third embodiment, the front screw portion 23c, a fitting portion (serving as an unthreaded portion) 23d, the step portion 23e and the rear screw portion 23a are formed at the outer circumferential surface of the screw shaft 23 in the mentioned order from the front end portion of the screw shaft 23. The front screw portion 23c functions as a connecting screw portion for fixedly connecting the connecting nut 46 thereon. The fitting portion 23d fits the sliding contact bush 76. The step portion (collar portion) 23e contacts a rear end surface of the sliding contact bush 76. The feeding nut 24 is screwed onto the rear screw portion 23a. An outer circumferential surface of the fitting portion 23d of the screw shaft 23 is not threaded.

The sliding contact bush 76, which is made from a metallic material, structures the intermediate member 7. More specifically, the sliding contact bush 76 includes an extending portion 76a, a flange portion 76b and a shaft bore 76c. The extending portion 76a extends in the axial direction of the screw shaft 23. The flange portion 76b is formed at a rear side of the extending portion 76a and is disposed at the rear side of the supporting portion 32b of the bolt 32. A diameter of the flange portion 76b is larger than a diameter of the extending portion 76a. The shaft bore 76c is sequentially formed through the extending portion 76a and the flange portion 76b in the axial direction of the screw shaft 23. The fitting portion 23d of the screw shaft 23 is inserted through the shaft bore 76c of the sliding contact bush 76. An inner circumferential surface of the shaft bore 76c is not threaded. The extending portion 76a of the sliding contact bush 76 serves as the radial portion. An outer circumferential surface of the extending portion 76a (serving as the radial sliding contact surface) slidably contacts the inner circumferential surface of the bearing hole 32c (serving as the radial bearing surface) formed at the supporting portion 32b of the bolt 32. Thus, the extending portion 76a of the sliding contact bush 76 is rotatably supported by the supporting portion 32b. Further, a rear opening rim portion of the shaft bore 76c of the sliding contact bush 76 is engaged with the step portion 23e of the screw shaft 23. Thus, the rear opening rim portion of the shaft bore 76c structures a contact portion (collar contact portion), which contacts the step portion 23e of the screw shaft 23. The flange portion 76b of the sliding contact bush 76 serves as the thrust portion. A front end surface of the flange portion 76b (serving as the first/second thrust sliding contact surface) slidably contacts the rear end surface of the supporting portion 32b (serving as the first/second thrust bearing surface) of the bolt 32.

Further, the connecting nut 46 is provided at the front side of the bolt 32 so as to be opposite from the sliding contact bush 76 relative to the bolt 32. The connecting nut 46 includes an extending portion 46a, a flange portion 46b, a protruding end portion 46d and an internal thread portion 46c. The extending portion 46a extends in the axial direction of the screw shaft 23. The flange portion 46b is formed at a rear side of the extending portion 46a and is disposed at the front side of the supporting portion 32b of the bolt 32. A diameter of the flange portion 46b is arranged to be larger than a diameter of the extending portion 46a. The protruding end portion 46d extends from a rear end portion of the flange portion 46b. A diameter of the protruding end portion 46d is formed to be smaller than the diameter of the flange portion 46b. The internal thread portion 46c is formed sequentially through the extending portion 46a, the flange portion 46b and the protruding end portion 46d in the axial direction of the screw shaft 23. The front screw portion 23c of the screw shaft 23 is inserted through the thread portion 46c, so that the thread potion 46c is screwed onto the front screw portion 23c. An outer circumferential surface of the protruding end portion 46d slidably contacts a part of the inner circumferential portion of the shaft bore 32c of the bolt 32. An axially rear end surface of the protruding end portion 46d of the connecting nut 46 is provided adjoining a front end surface of the sliding contact bush 76 with a slight clearance therebetween. The connecting nut 46 and the step portion 23e formed at the screw shaft 23 structure first and second collar portions provided at the screw shaft 23.

The elastic washer (serving as the elastic thrust portion) 74 structuring the intermediate member 7 is provided between the flange portion 46b of the connecting nut 46 and the supporting portion 32b of the bolt 32 at an outer circumferential surface of the protruding end portion 46d of the connecting nut 46. The same elastic washer according to the second embodiment may be employed as the elastic washer 74 as an example. A rear end surface of the elastic washer 74 (serving as the first/second thrust sliding contact surface) elastically contacts the front end surface of the supporting portion 32b (serving as the first/second thrust bearing surface) of the bolt 32 by the elastic force of the elastic washer 74. Further, because the front end surface of the elastic washer 74 contacts the connecting nut 46 tightened to the screw shaft 23, the rear end surface of the elastic washer 74 is elastically pressed to the front end surface of the supporting portion 32b in the axial direction of the screw shaft 23.

The elastic washer 74 and the connecting nut 46 structure the elastic biasing mechanism. The connecting nut 46 is tightened to the front screw portion (serving as the connecting screw portion) 23c of the screw shaft 23 and the elastic washer 74 is accordingly elastically deformed. Accordingly, the front end surface of the flange portion 76b formed at the sliding contact bush 76 and the rear end surface of the elastic washer 74 are arranged to elastically contact the rear and front end surfaces of the supporting portion 32b of the bolt 32, respectively, and the elastic washer 74 is elastically biased to the sliding contact bush 76. Thus, errors such as the dimensional error and the assembling error between the screw shaft 23 and the sliding contact bush 76 are tolerated.

The bolt 32 is fixed to the front supporting bracket 31 of which a cross sectional shape is formed in an L-shape. A front end portion of the front supporting bracket 31 is bent vertically upwardly, thereby forming the vertical bent portion 31b. A fixing hole 31d is formed at the vertical bent portion 31b. A connecting member for fixing the gear box 51 is inserted into the fixing bore 31d of the front supporting bracket 31. Further, the upper rail 22 is fixed to an upper rim surface portion of the bolt hole 35 formed at the front supporting bracket 31 by being interposed between the front supporting bracket 31 and a connecting member such as a nut.

According to the third embodiment, when assembling the sliding contact bush 76, the connecting nut 46 and the bolt 32 onto the screw shaft 23, first, the sliding contact bush 76 is assembled onto the screw shaft 23 from the front side of the screw shaft 23 so that the screw shaft 23 penetrates through the sliding contact bush 76, and the rear opening rim portion of the shaft bore 76c formed at the sliding contact bush 76 is arranged to contact the step portion 23e formed at the screw shaft 23. Thus, the sliding contact bush 76 is supported by an engagement between the shaft bore 76c and the fitting portion 23d of the screw shaft 23. Next, the extending portion 76a of the contact bush 76 supported by the screw shaft 23 is inserted into the bearing hole 32c formed at the bolt 32. Then, the elastic washer 74 is assembled onto the screw shaft 23 from the front side thereof so that the screw shaft 23 penetrates through the elastic washer 74. Furthermore, the connecting nut 46 is screwed onto the screw shaft 23 from the front side thereof and is tightened to the front screw portion 23c of the screw shaft 23, so that the rear end surface of the protruding end portion 46d of the connecting nut 46 is arranged to adjoin the front end surface of the extending portion 76a of the sliding contact bush 76. In such configuration, the connecting nut 46 is tightened in a condition where the elastic washer 74 is axially elastically deformed with the tightening torque with which the connecting nut 46 is prevented from loosening even when the screw shaft 23 is driven to rotate, i.e., with the tightening torque being larger than the rotational torque of the screw shaft 23. Accordingly, the elastic washer 74 is axially compressed and is accordingly elastically deformed in the axial direction of the screw shaft 23, and the rear end surface of the flange portion 46b of the connecting nut 46 is arranged to slidably and elastically contact the front end surface of the supporting portion 32b of the bolt 32.

According to the third embodiment, the rear opening rim portion of the extending portion 76a of the sliding contact bush 76 is pressed in the axial direction towards the step portion 23e formed at the screw shaft 23 by the tightening force of the connecting nut 46 applied in the axial direction of the screw shaft 23. Accordingly, the sliding contact bush 76 is arranged to surely fit the fitting portion 23d of the screw shaft 23 without dislocating in the axial direction of the screw shaft 23.

Further, the elastic washer 74 is provided between the front end surface of the supporting portion 32b of the bolt 32 and the flange portion 46b of the connecting nut 46. Still further, the rear end surface of the elastic washer 74 elastically contacts the front end surface of the supporting portion 32b of the bolt 32 by the elastic force of the elastic washer 74. Accordingly, the elastic washer 74 tolerates a dimensional error of the connecting nut 46, so that the screw shaft 23 is allowed to smoothly rotate relative to the supporting portion 32b of the bolt 32.

Figure 11:
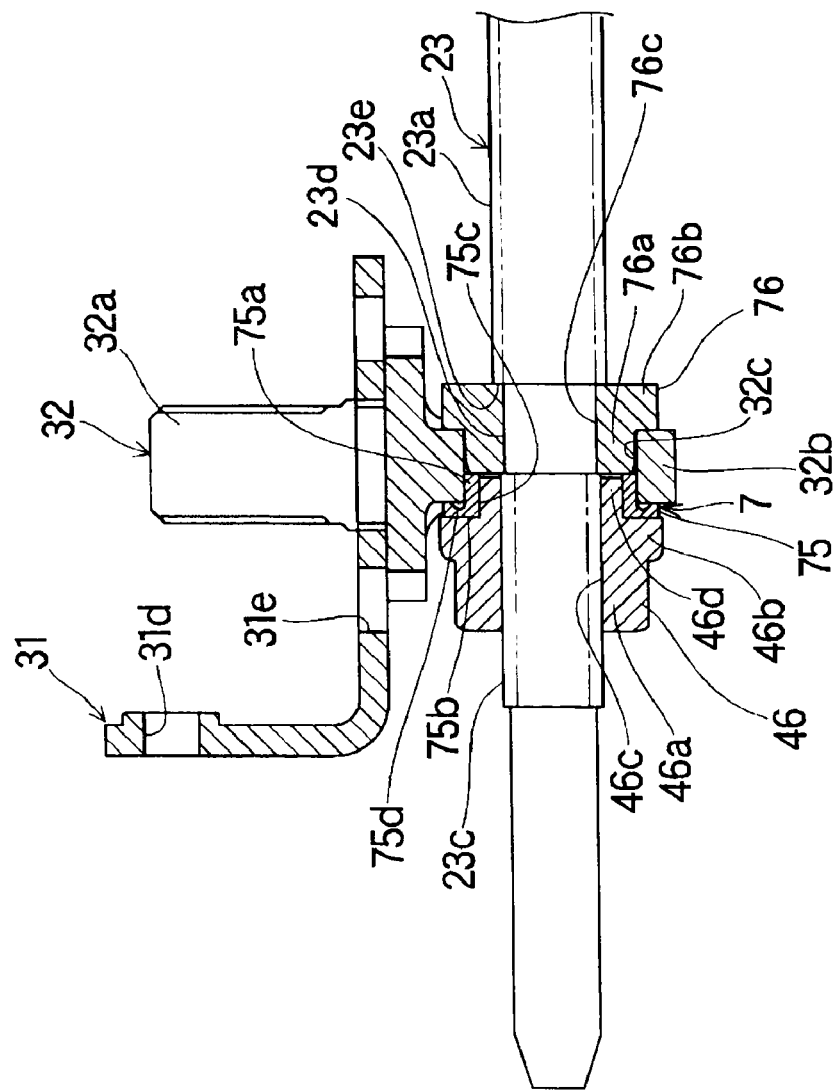
FIG. 11 is an enlarged cross sectional view partially illustrating the power seat slide apparatus according to the fourth embodiment.
Figure 12:
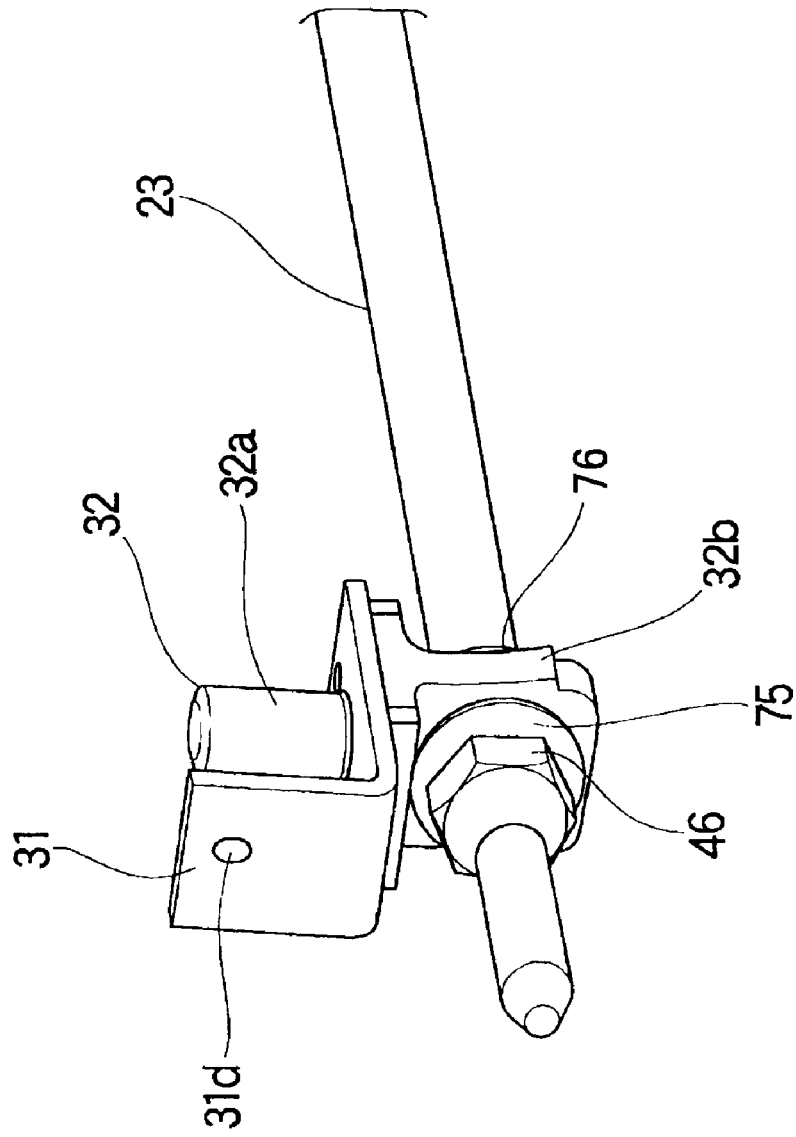
FIG. 12 is an enlarged perspective view partially illustrating the power seat slide apparatus according to the fourth embodiment.
Figure 13:
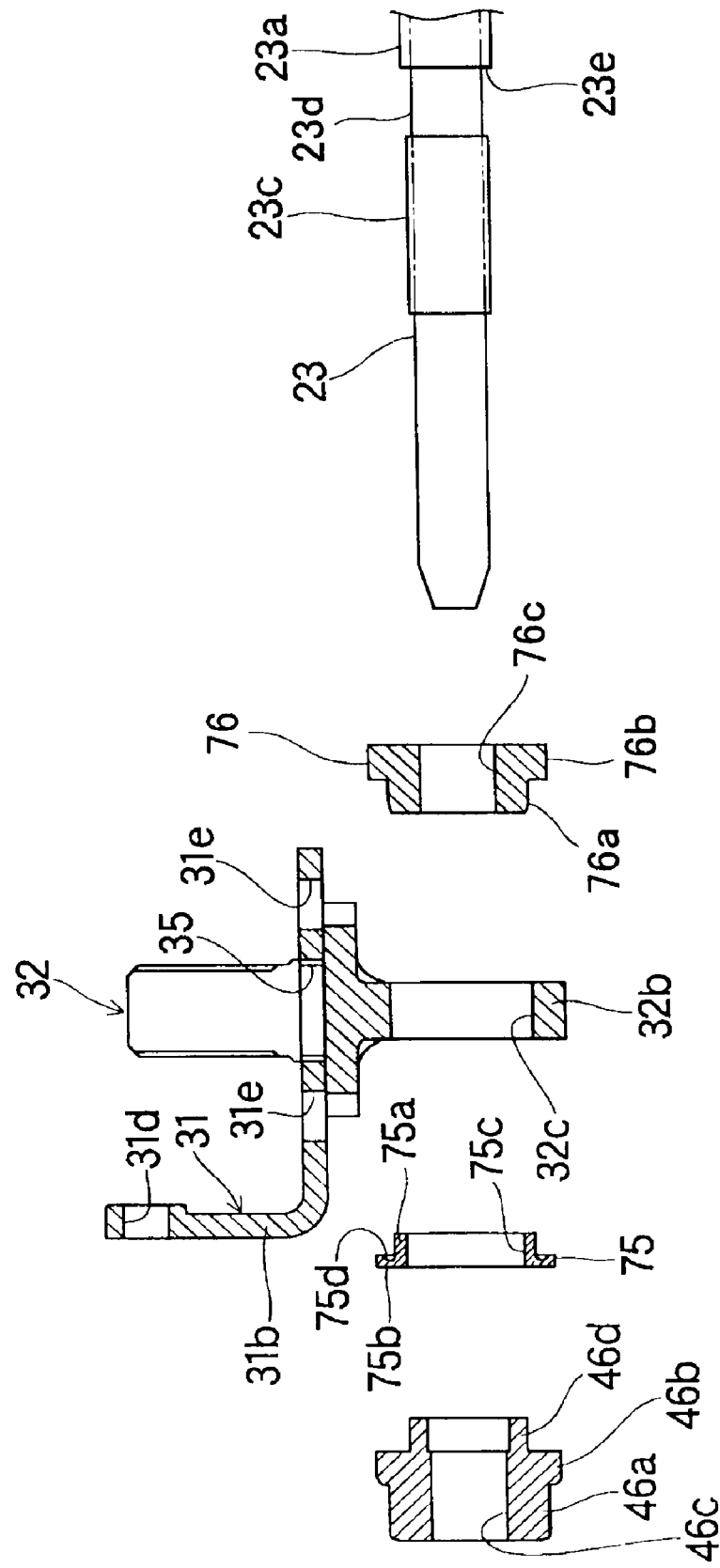
FIG. 13 is an exploded cross sectional view partially illustrating the power seat slide apparatus according to the fourth embodiment.

According to a fourth embodiment, being different from the third embodiment, an elastic bush 75 is provided between the supporting portion 32b of the bolt 32 and the connecting nut 46 as the elastic member in place of the elastic washer 74 according to the third embodiment, as illustrated in FIGS. 11 to 13.

The elastic bush 75 is made from an elastic material, such as a soft resin material, a rubber material, or the like, for example. The elastic bush 75 includes a cylindrical portion (serving as the radial portion) 75a, a flange portion (serving as the elastic thrust portion) 75b and a hole portion 75c. The cylindrical portion 75a is provided between the inner circumferential surface of the bearing hole 32c of the bolt 32 and the outer circumferential surface of the protruding end portion 46d of the connecting nut 46. The flange portion 75b includes an elastic deformable portion formed at a front side of the cylindrical portion 75a so as to protrude therefrom in a radially outward direction thereof. A diameter of the flange portion 75b is arranged to be larger than a diameter of the cylindrical portion 75a. The hole portion 75c is formed sequentially through the cylindrical portion 75a and the flange portion 75b. The protruding end portion 46c of the connecting nut 46 is inserted into the hole portion 75c. A groove portion 75d is formed at a rear end surface of the flange portion 75b so as to sequentially extend in a circumferential direction thereof. The groove portion 75d may be formed partially in the circumferential direction of the flange portion 75b. Alternatively, plural recesses aligned in the circumferential direction of the flange portion 75b may be employed as the groove portion 75d. Because of the groove portion 75d, the flange portion 75b is easily elastically deformed in the axial direction of the screw shaft 23. Further, because the rear end surface of the flange portion 75b (serving as the first/second thrust sliding contact surface) elastically contacts the front end surface of the supporting portion 32b of the bolt 32, the rear end surface of the supporting portion 32b elastically contacts the front end surface of the flange portion 76b (serving as the first/second thrust sliding contact surface) of the sliding contact bush (serving as the thrust receiving member) 76. An outer circumferential surface of the cylindrical portion 75a (serving as the radial sliding contact surface) is relatively slidably and rotatably supported by the inner circumferential surface of the bearing hole 32c (serving as the radial bearing surface) formed at the supporting portion 32b of the bolt 32.

The rear end surface of the connecting nut 46 is disposed in the vicinity of the front end surface of the sliding contact bush 76. The rear end surface of the cylindrical portion 75a of the elastic bush 75 elastically contacts the front end surface of the sliding contact bush 76 by the elastic force of the elastic bush 75 and elastically presses the contact portion (serving as a collar contact portion) of the sliding contact bush 76 to the step portion (collar portion) 23e formed at the screw shaft 23. The outer circumferential surface of the cylindrical portion 75a of the elastic bush 75 and the outer circumferential surface of the extending portion 76a of the sliding contact bush 76 are arranged to be coplanar so as to slidably contact the inner circumferential surface of the bearing hole 32c formed at the supporting portion 32b of the bolt 32. According to the fourth embodiment, the sliding contact bush 76 is made from the metallic material, for example, and includes the extending portion 76a and the flange portion 76b in the same manner as the third embodiment. The outer circumferential surface of the extending portion 76a structures a radial sliding contact surface which is rotatably supported by the supporting portion 32b of the bolt 32. The flange portion 76b structures the thrust portion which is also rotatably supported by the supporting portion 32b of the bolt 32.

The flange portion 75b of the elastic bush 75 and the connecting nut 44 structure the elastic biasing mechanism. When the connecting nut 46 is screwed onto the front screw portion 23c of the screw shaft 23 and is tightened thereto, the flange portion 75b of the elastic bush 75 accordingly elastically deforms. Therefore, the front end surface of the flange portion 76b of the sliding contact bush 76 and the rear end surface of the flange portion 75b of the elastic bush 75 elastically contact the rear and front end surfaces of the supporting portion 32b, respectively, and the elastic bush 75 is elastically biased towards the sliding contact bush 76. Accordingly, the dimensional error, the assembling error, and the like, generated between the screw shaft 23 and the sliding contact bush 76 are tolerated.

According to the fourth embodiment, the rear end surface of the cylindrical portion 75a of the elastic bush 75 elastically contacts the front end surface of the sliding contact bush 76, and the contact portion of the sliding contact bush 76 is accordingly elastically pressed in the axial direction of the screw shaft 23 to the step portion 23e of the screw shaft 23. Therefore, the sliding contact bush 76 surely fits the fitting portion 23d of the screw shaft 23 without dislocating in the axial direction. Further, the sliding contact bush 76 and the elastic bush 75 allow the screw shaft 23 to smoothly rotate relative to the bolt 23.

Further, the flange portion 75b of the elastic bush 75 is provided between the front end surface of the supporting portion 32b of the bolt 32 and the flange portion 46b of the connecting nut 46, and the rear end surface of the flange portion 75b of the elastic bush 75 elastically contacts the front end surface of the supporting portion 32b of the bolt 32 by the elastic force of the elastic bush 75. Accordingly, the flange portion 75b tolerates the dimensional error of the connecting nut 46 more effectively than the elastic washer 74 according to the third embodiment. Thus, the screw shaft 23 is allowed to rotate further smoothly relative to the bolt 32.

The connecting nut 46 is screwed onto the screw shaft 23 in a condition where the elastic bush 75 is elastically deformed in the axial direction with the tightening torque with which the connecting nut 46 is prevented from loosening even when the screw shaft 23 is driven to rotate, i.e., with the tightening torque being larger than the rotational torque of the screw shaft 23. Accordingly, the connecting nut 46 is surely fixed to the screw shaft 23 without loosening.

Each of the elastic washer 74 according to the third embodiment and the elastic bush 75 according to the fourth embodiment is disposed at the front side of the supporting portion 32b of the bolt 32. However, the elastic washer 74 and the elastic bush 75 may be provided at the rear side of the supporting portion 32b of the bolt 32 in the corresponding embodiment. In such a configuration, according to the third embodiment, the front end surface of the elastic washer 74 elastically contacts the rear end surface of the supporting portion 32b of the bolt 32 by the elastic force of the elastic washer 74. Further, the rear end surface of the elastic washer 74 contacts the front end surface of the flange portion 76b of the sliding contact bush 76. Accordingly, the front end surface of the elastic washer 74 is elastically pressed to the rear end surface of the supporting portion 32b of the bolt 32. In the same manner, in such a configuration according to the fourth embodiment, the front end surface of the elastic bush 75 elastically contacts the rear end surface of the supporting portion 32b of the bolt 32 by the elastic force of the elastic bush 75. Further, the rear end surface of the elastic bush 75 contacts the front end surface of the flange portion 76b of the sliding contact bush 76. Accordingly, the front end surface of the elastic bush 75 is elastically pressed to the rear end surface of the supporting portion 32b of the bolt 32.

Figure 14:
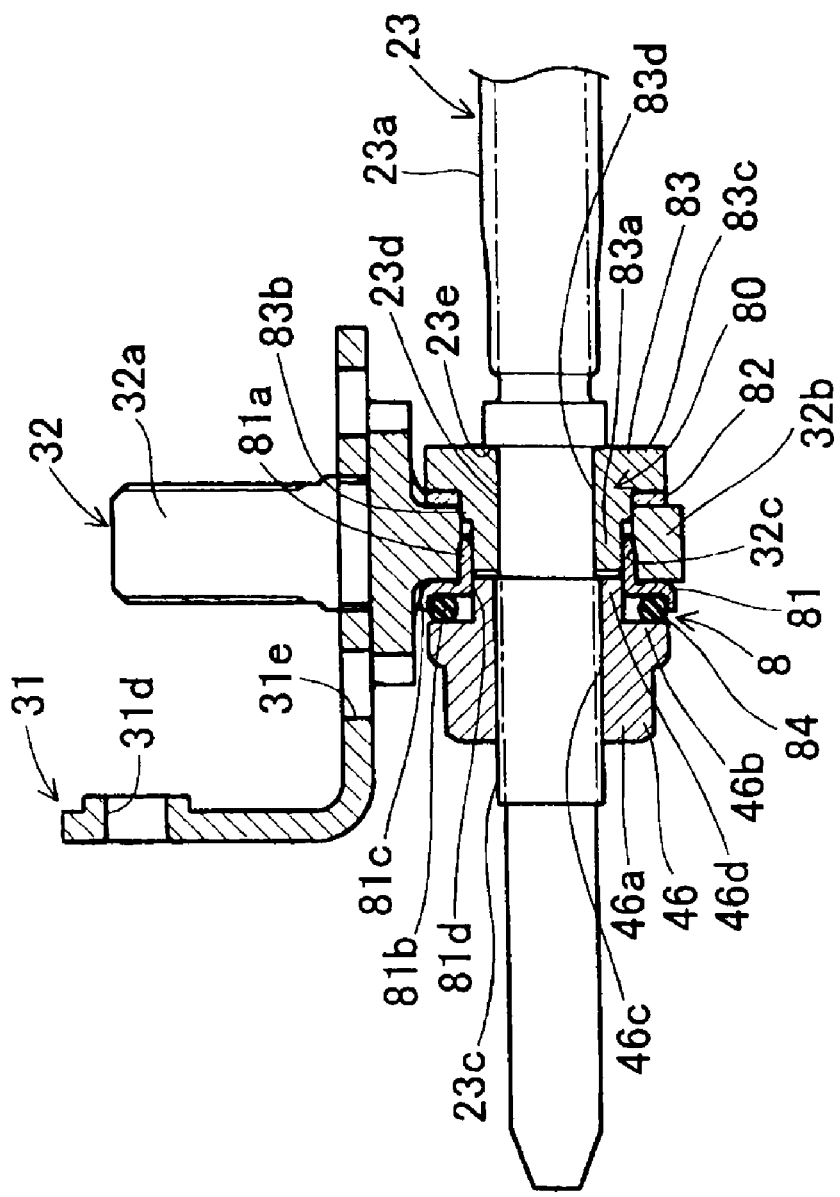
FIG. 14 is an enlarged cross sectional view partially illustrating the power seat slide apparatus according to the fifth embodiment.
Figure 15:
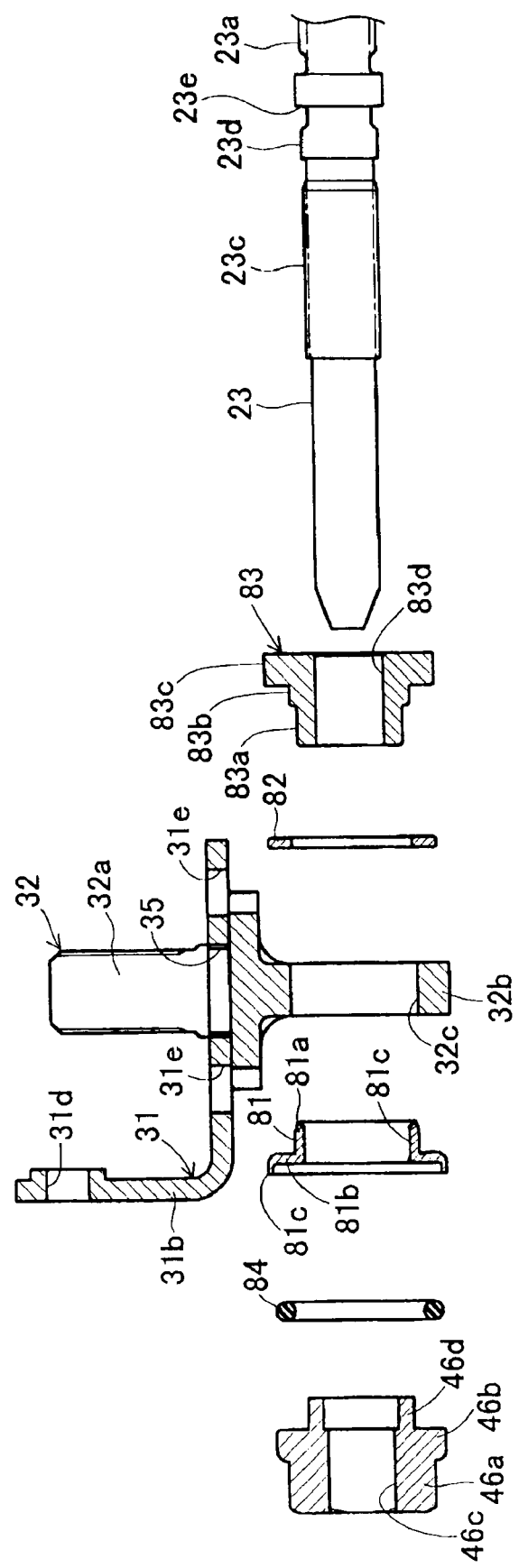
FIG. 15 is an exploded cross sectional view partially illustrating the power seat slide apparatus according to the fifth embodiment.

According to a fifth embodiment, as illustrated in FIGS. 14 and 15, the power seat slide apparatus 12 includes an intermediate member 8 which is structured with a sliding contact member 80 and an annular elastic member 84. The sliding contact member 80 is arranged to slidably contact the supporting portion 32b of the bolt 32. The annular elastic member 84 having the elasticity serves as the elastic biasing mechanism. According to the fifth embodiment, being different from the first embodiment, the sliding contact member 80 and the annular elastic member 84 are separately provided.

The front screw portion 23c serving as the connecting screw portion onto which the connecting nut 46 is tightened, the fitting portion 23d configured to fit a fitting member (serving as the thrust receiving member) 83, the step portion (serving as the collar portion) 23e configured to contact a rear end surface of the fitting member 83, and the rear screw portion 23a onto which the feeding nut 24 is screwed, are formed at the outer circumferential surface of the screw shaft 23 in the mentioned order from the front end portion of the screw shaft 23.

According to the fifth embodiment, the intermediate member 8 includes the sliding contact member 80, which is arranged to slidably contact the supporting portion 32b of the bolt 32, and the annular elastic member 84, which has the elasticity. The sliding contact member 80 is structured with a front sliding contact member 81, a rear sliding contact member 82 and the fitting member 83. The fitting member 83, which is made from a metallic material, includes an extending portion 83a, an intermediate portion 83b, a flange portion 83c and a shaft bore 83d. The extending portion 83a extends in the axial direction (the thrust direction) of the screw shaft 23. The intermediate portion 83b is formed at a rear side of the extending portion 83a. A diameter of the intermediate portion 83b is formed to be slightly larger than a diameter of the extending portion 83a. The flange portion 83c is formed at a rear side of the intermediate portion 83b and is disposed at the rear side of the supporting portion 32b of the bolt 32. A diameter of the flange portion 83c is formed to be larger than that of the intermediate portion 83b. The shaft bore 83d is sequentially formed through the extending portion 83a, the intermediate portion 83b and the flange portion 83c. The fitting portion 23d of the screw shaft 23 is inserted through the shaft bore 83d. The front sliding contact member 81 is provided between the outer circumferential surface of the extending portion 83a and the bearing hole 32c formed at the supporting portion 32b of the bolt 32. An outer circumferential surface of the intermediate portion 83b slidably contacts a rear portion of the inner circumferential surface of the bearing hole 32c of the bolt 32. The rear sliding contact member 82 is provided between a front end surface of the flange portion 83c and the rear end surface of the supporting portion 32b. A rear opening rim portion of the shaft bore 83d is engaged with the step portion 23e formed at the screw shaft 23.

The rear sliding contact member 82 is a plane washer made from a metallic material, for example. The rear sliding contact member 82 is supported at the front end surface of the fitting member 83, so that a front end surface of the sliding contact member 82 (serving as the first/second thrust sliding contact surface) slidably contacts the rear end surface of the supporting portion 32b of the hole 32.

The connecting nut 46 is provided at the front side of the bolt 32 so as to be opposite from the rear sliding contact member 82 relative to the bolt 32. In the same manner as the third and fourth embodiments, the connecting nut 46 includes the extending portion 46a, the flange portion 46b, the internal thread portion 46c and the protruding end portion 46d. The connecting nut 46 structures a first collar portion provided at the screw shaft 23, while the step portion 23e formed at the screw shaft 23 structures a second collar portion provided at the screw shaft 23. The outer circumferential surface of the protruding end portion 46d of the connecting nut 46 and an outer circumferential surface of the intermediate portion 83b of the fitting member 83 of the sliding contact member 80 are arranged to be coplanar.

The front sliding contact member (serving as a radial thrust member) 81 is made from a metallic material, for example. The front sliding contact portion 81 includes a cylindrical portion (serving as the radial portion) 81a, a flange portion (serving as the thrust portion) 81b and a hole portion 81d. The radial sliding contact surface is formed at a circumferential surface of the cylindrical portion 81a. The flange portion 81b radially outwardly protrudes from the cylindrical portion 81a so that a diameter of the flange portion 81b is formed to be larger than that of the cylindrical portion 81a. A thrust sliding contact surface (first/second thrust sliding contact surface) is formed at a rear end surface of the flange portion 81b. The hole potion 81d is sequentially formed through the cylindrical portion 81a and the flange portion 81b. The cylindrical portion 81a is provided along the outer circumferential surface of the protruding end portion 46b of the connecting nut 46 and an outer circumferential surface of the intermediate portion 83b of the fitting member 83. An outer circumferential surface of the cylindrical portion 81a (a surface being opposite from another surface facing the outer circumferential surfaces of the protruding end portion 46d of the connecting nut 46 and of the intermediate portion 83b of the fitting member 83) faces the inner circumferential surface of the bearing hole 32c formed at the supporting portion 32b of the bolt 32. The annular elastic member 84 is provided between a front end surface of the flange portion 81b and a rear end surface of the flange portion 46b of the connecting nut 46. The annular elastic member 84, which has the elasticity in the axial direction of the screw shaft 23 (the thrust direction), is formed in a ring shape while having a circular cross sectional shape and is made from an elastic material, such as a rubber material, silicone material, or the like. An annular supporting portion 81c is formed at an outer circumferential portion of the flange portion 81b. The annular supporting portion 81c is formed by bending an outer circumferential end portion of the flange portion 81b in the front direction for supporting an outer circumferential portion of the annular elastic member 84. Thus, the annular elastic member 84 is prevented from dislocating towards the outer circumferential side thereof, i.e., in the radially outer direction. Thus, the annular elastic member 84 is supported between the flange portion 81b of the front sliding contact member 81 and the one of the connecting nut 46 and the fitting member 83, thereby greatly improving (extending) the useful life of the annular elastic member 84. The rear end surface of the flange portion 81b (serving as the first/second thrust sliding contact surface) of the front sliding contact member 81 is pressed to the front end surface of the supporting portion 32b of the bolt 32 by the elastic force of the annular elastic member 84. Accordingly, the supporting portion 32b presses the rear sliding contact member 82 to the flange portion 83b of the fitting member 83 by the rear end surface of the supporting portion 32b.

The rear end surface of the connecting nut 46 is provided in the vicinity of the front end surface of the fitting member 83 while having a slight clearance therebetween. The connecting nut 46 elastically presses the fitting member 83 in the thrust direction to the step portion 23e of the screw shaft 23 by the connecting force (tightening force) applied to the front screw portion 23c of the screw shaft 23 and the elastic force of the annular elastic member 84.

The annular elastic member 84 structures the elastic biasing mechanism. More specifically, the annular elastic member 84 is provided between the connecting nut 46 and the flange portion 81b of the front sliding contact member 81 for biasing the front sliding contact member 81 in the axial direction of the screw shaft 23 to the fitting member 83. The dimensional error, the assembling error, or the like, generated between the screw shaft 23 and the front sliding contact member 81 is tolerated by the annular elastic member 84. Accordingly, the intermediate member 8 allows the screw shaft 23 to smoothly rotate relative to the bolt 32.

The fitting portion 23d of the screw shaft 23 faces the inner circumferential surface of the bearing hole 32c of the bolt 32 via the fitting member 83 of the sliding contact member 80. Further, a load such as a seat weight is continuously applied to the fitting portion 23d of the screw shaft 23 from the bolt 32 via the fitting member 83. Accordingly, in a condition where a thread portion is formed at the fitting portion 23d of the screw shaft 23, the thread portion may be damaged by the load applied from the bolt 32. Therefore, the fitting portion 23d of the screw shaft 23 and an inner circumferential surface of the shaft bore 83d of the fitting member 83, which face the fitting portion 23d of the screw shaft 23, are not threaded. Accordingly, the load is prevented from being applied intensively to the fitting portion 23d facing the bolt 32 in the radial direction, thereby preventing the screw shaft 23 from being damaged. Therefore, the feeding nut 24 is stably screwed onto the rear screw portion 23a (the feeding screw portion) of the screw portion 23, and the connecting nut 46 is also stably tightened onto the front screw portion 23c of the screw shaft 23. As a consequence, a feeding operation of the above described feeding apparatus is smoothly performed by the relative movement between the feeding screw portion 23c of the screw shaft 23 and the feeding nut 24.

According to the fifth embodiment, the intermediate member 8 is structured with the sliding contact member 80, which slidably contacts the supporting portion 32b of the bolt 32 in the radial direction and in the thrust direction, and the annular elastic member 84, which presses the sliding contact member 80 in the thrust direction to the supporting portion 32b of the bolt 32 by the elastic force acting in the thrust direction. In other words, the sliding contact member 80 performs a slide-contact function, while the annular elastic member 84 performs the elastic function. Thus, because the different members respectively achieve the slide-contact function and the elastic function, a maximum effect of each function is achieved.

Further, a rear opening rim portion of the shaft bore 83d of the fitting member 83 is elastically pressed to the step portion 23e formed at the screw shaft 23 by the tightening force of the connecting nut 46 acting in the thrust direction and the elastic force of the annular elastic member 84. Accordingly, the fitting member 83 surely fits the fitting portion 23d of the screw shaft 23 without dislocating in the thrust direction.

Further, the annular elastic member 84 elastically contacts the flange portion 81b of the front sliding contact member 81 and accordingly elastically presses the flange portion 81b to the front end surface of the supporting portion 32b of the bolt 32. Accordingly, the supporting portion 32b of the bolt 32 elastically presses, by the rear end surface thereof, the rear siding contact member 82 to the fitting member 83. Accordingly, the fitting member 83 and the screw shaft 23 are assembled without a clearance therebetween, thereby allowing the front and rear sliding contact members 81, 82 to smoothly slidably contact the supporting member 32b of the bolt 32.

The annular elastic member 84 is formed in the ring shape while the cross section thereof is formed in a circular shape. Accordingly, the annular elastic member 84 circularly linearly contacts the front sliding contact member 81 and the connecting nut 46 fixed to the screw shaft 23 and applies the elastic force thereto symmetrically relative to the axial center thereof (axial center corresponding to the axial center of the screw shaft 23). Further, a circularly linear contacting portion of the annular elastic member 84, i.e., a range between a portion where the annular elastic member 84 circularly linearly contacts the front sliding contact member 81 and a portion where the annular elastic member 84 circularly linearly contacts the connecting nut 46, is arranged to have a large thickness. Thus, when the annular elastic member 84 is compressed by the front sliding contact portion 81 and the connecting nut 46, the annular elastic member 84 is deformed (compressed) sufficiently in a balanced manner relative to the axial center thereof. Thus, the annular elastic member 84 achieves a satisfactory balanced elasticity in the thrust direction.

According to the fifth embodiment, the annular elastic member 84 and the front sliding contact member 81 formed by a bush member for supporting the annular elastic member 84 are disposed at the front side of the supporting portion 32b of the bolt 32, while the rear sliding contact member 82 formed by a plane washer is disposed at the rear side of the supporting portion 32b of the bolt 32. However, those components may be disposed at the front and rear sides of the supporting portion 32b of the bolt 32 in an inverted manner. Further, the annular elastic member 84 and the front sliding contact member 81 for supporting the annular elastic member 84 may be disposed not only at the front side of the supporting portion 32b of the bolt 32 but also at the rear side thereof. Still further, the rear sliding contact member 82 may not necessarily be provided. In such a condition, the front end surface of the flange portion 83c of the fitting member 83 serves as the thrust sliding contact surface (first/second thrust sliding contact surface) which slidably contacts the rear end surface of the supporting portion 32b of the bolt 32.

Thus, according to the first to fifth embodiments, the radial sliding contact surface (the external circumferential surface of the cylindrical portion 71a, the external circumferential surface of the cylindrical collar portion 73, the external circumferential surface of the extending portion 76a of the sliding contact bush 75, the external circumferential surface of the cylindrical portion 75a of the elastic bush 75, the external circumferential surface of the cylindrical portion 81a of the front sliding contact member 81) relatively slidably contacts the radial bearing surface (the inner circumferential surface of the bearing hole 32c formed at the bolt 32). Further, the first sliding contact surface (according to the embodiments, the front end surface of the elastic protruding collar portion 71b, the front end surface of the elastic washer 74, the front end surface of the flange portion 76b, the front end surface of the rear sliding contact member 82) relatively slidably contacts the first thrust bearing surface (according to the embodiments, the rear end surface of the supporting portion 32b of the bolt 32). Still further, the second sliding contact surface (according to the embodiments, the rear end surface of the plane washer 72, the rear end surface of the elastic washer 74, the rear end surface of the flange portion 75b, the rear end surface of the flange portion 81b of the front sliding contact member 81) relatively slidably contacts the second thrust bearing surface (according to the embodiments, the front end surface of the supporting portion 32b of the bolt 32). Accordingly, the intermediate member 7/8 is allowed to smoothly slidably rotate relative to the supporting portion 32b of the bolt 32 fixedly connected to the front supporting bracket 31.

Further, because the elastic biasing mechanism (according to the embodiments, the elastic protruding collar portion 71b of the bush 71 and the connecting nut 44, the elastic washer 74 and the connecting nut 44, the elastic washer 74 and the connecting nut 46, the flange portion 75b of the elastic washer 75 and the connecting nut 46, the annular elastic member 84) elastically biases the first and second thrust sliding contact surfaces of the intermediate member 7/8 to contact the first and second thrust bearing surfaces (axially rear and front surfaces) of the supporting portion 32b of the bolt 32 and also elastically biases the intermediate member 7/8 to the thrust receiving member (according to the embodiment, the fixing nut 43, the sliding contact bush 76 and the fitting member 83), the intermediate member 7/8 and the thrust receiving member are provided on the screw shaft 23 without a clearance between the intermediate member 7/8 and the thrust receiving member. Accordingly, the dimensional error, the assembling error, and the like, of the screw shaft 23 and of the thrust receiving member is tolerated by the elastic biasing mechanism. Therefore, the screw shaft 23 is allowed to rotate smoothly relative to the bolt 32 connected to the front supporting bracket 31, and the movable member (for example, the upper rail 22) is accordingly smoothly moved relative to the fixture member (for example, the lower rail 21).

According to the first embodiment, the elastic biasing mechanism comprises the elastic protruding collar portion 71b (the elastic thrust portion at which one of the first and second thrust sliding contact surfaces is formed) and the connecting nut 44 mounted onto the front screw portion 23c (the connecting screw portion) formed at the screw shaft 23 at an axially opposite side of the fixing nut 43 (the thrust receiving member) relative to the supporting portion 32b of the bolt 32. The elastic protruding collar portion 71*b* radially protrudes from the cylindrical portion (radial portion at which the radial sliding contact surface is formed) of the bush 71 and inclines in the axial direction of the screw shaft 23 from the radially inward portion to a radially outward portion thereof. The elastic protruding collar portion 71*b* of the bush 71 is elastically deformed by tightening the connecting nut 44 onto the front screw portion 23*c* of the screw shaft 23. Accordingly, the front end surface of the elastic protruding collar portion 71*b* (according to the first embodiment, serving as the first thrust sliding contact surface) and the rear end surface of the plane washer 72 (according to the first embodiment, serving as the second thrust sliding contact surface) elastically contact the rear and front end surfaces of the supporting portion 32*b* of the bolt 32, respectively, and the intermediate member 7 is elastically biased in the axial direction of the screw shaft 23 towards the fixing nut 43.

Due to the above described structure, because the elastic protruding collar portion 71*b* of the bush 71 is elastically deformed by tightening the connecting nut 44 onto the front screw portion 23*c*, the front end surface of the elastic protruding collar portion 71*b* elastically contacts the rear end surface of the supporting portion 32*b* of the bolt 32, and the elastic protruding collar portion 71*b* of the intermediate member 7 is elastically biased to the fixing nut 43. Accordingly, the dimensional error, the assembling error, and the like, between the crew shaft 23 and the fixing nut 43 are tolerated by the elastic biasing mechanism structured with the elastic protruding collar portion 71*b* and the connecting nut 44. Therefore, the intermediate member 7 allows the screw shaft 23 to rotate smoothly relative to the bolt 32 connected to the front supporting bracket 31.

According to the second embodiment, the intermediate member 7 includes the cylindrical collar portion 73 (the radial portion at which the radial sliding contact surface is formed), the elastic washer 74 (the annular elastic thrust portion at which one of the first and second thrust sliding contact surface is formed) and the plane washer 72 (the thrust portion at which the other of the first and second thrust sliding contact surface is formed). According to the second embodiment, the front end surface of the elastic washer 74 serves as the first thrust sliding contact surface, while the rear end surface of the plane washer 72 serves as the second thrust sliding contact surface. The cylindrical collar portion 73 fits the screw shaft 23. The elastic washer 74 is elastically deformable in the axial direction of the screw shaft 23 at the radially inward portion and the radially outward portion thereof. Further, the elastic biasing mechanism comprises the elastic washer 74 of the intermediate member 7 and the connecting nut 44 mounted onto the front screw portion 23*c* (the connecting screw portion) formed at the screw shaft 23 at the axially opposite side of the fixing nut 43 relative to the supporting portion 32*b* of the bolt 32. The elastic washer 74 is elastically deformed by tightening the connecting nut 44 onto the screw shaft 23. Accordingly, the plane washer 72 is elastically biased towards the front end surface of the supporting portion 32*b* of the bolt 32, and the intermediate member 7 is pressed in the axial direction of the screw shaft 23 towards the fixing nut 43.

Due to the above described structure, because the elastic washer 74 is elastically deformed by tightening the connecting nut 44 onto the front screw portion 23*c* of the screw shaft 23, the plane washer 72 is elastically biased in the axial direction of the screw shaft 23 to the front end surface of the supporting portion 32*b* of the bolt 32, and the intermediate member 7 is elastically pressed to the fixing nut 43. Therefore, the dimensional error, the assembling error, and the like, between the screw shaft 23 and the fixing nut 43 are tolerated by the elastic biasing mechanism, structured with the elastic washer 74 and the connecting nut 44. Accordingly, the intermediate member 7 allows the screw shaft 23 to smoothly rotate relative to the bolt 32 connected to the front supporting bracket 31.

According to the first and second embodiments, the fixing nut 43 is tightened to the partial screw portion 23*b* formed at the outer circumferential surface of the screw shaft 23 so as to be fixedly connected thereto.

Due to the above described structure, the fixing nut 43 is fixedly tightened to the partial screw portion 23*b* (incomplete screw portion) of the screw shaft 23. More specifically, the fixing nut 43 is supported at the raising portion 23*n* formed at the partial screw portion 23*b*. Accordingly, the fixing nut 43 is fixedly connected to the screw shaft 23 without executing a compressing process, in which an end portion of the nut is compressed to connect the nuts onto the screw shaft 23 in a condition where the nut is screwed onto the screw shaft 23 as in the conventional manner. Therefore, the screw shaft 23 is prevented from deforming and is allowed to rotate smoothly.

Further according to the first and second embodiments, the connecting nut 44 is tightened to the screw shaft 23 in the condition in which the elastic thrust portion (the elastic protruding collar portion 71*b* according to the first embodiment, the elastic washer 74 according to the second embodiment) is elastically deformed in the axial direction of the screw shaft 23 with the tightening torque for preventing the connecting nut 44 from loosening by the rotation of the screw shaft 23.

Due to the above described structure, the connecting nut 44 is surely fixedly connected to the screw shaft 23 without loosening.

According to the third embodiment, the intermediate member 7 includes the elastic washer 74 (elastic thrust portion at which one of the first and second sliding contact surfaces is formed). The sliding contact bush 76 (thrust receiving member) includes the flange portion 76*b* (thrust portion at which the other of the first and second thrust sliding contact surfaces is formed). According to the third embodiment, the front end surface of the flange portion 76*b* serves as the first thrust sliding contact surface, while the rear end surface of the elastic washer 74 serves as the second thrust sliding contact surface. The elastic washer 74 is provided between one of the first and second thrust bearing surfaces of the supporting portion 32*b* of the bolt 32 (according to the third embodiment, the front end surface of the supporting portion 32*b*) and the connecting nut 46 mounted onto the front screw portion 23*c* (the connecting screw portion) of the screw shaft 23 at the axially opposite side of the sliding contact bush 76 relative to the bolt 32. The elastic biasing mechanism comprises the elastic washer 74 of the intermediate member 7 and the connecting nut 46. The elastic washer 74 is elastically deformed by tightening the connecting nut 46 onto the front screw portion 23*c* of the screw shaft 23. Accordingly, the front end surface of the flange portion 76*b* of the sliding contact bush 76 and the rear end surface of the elastic washer 74 elastically contact the rear and front end surfaces of the supporting portion 32*b* of the bolt 32, respectively, and the elastic washer 74 is elastically biased towards the sliding contact bush 76.

Due to the above described structure, because the elastic washer 74 is elastically deformed by tightening the connecting nut 46 onto the front screw portion 23*c* of the screw shaft 23, the front end surface of the flange portion 76*b* of the sliding contact bush 76 and the rear end surface of the elastic washer 74 are arranged to elastically contact the rear and front end surfaces of the supporting portion 32*b* of the bolt 32, and the elastic washer 74 is elastically biased in the axial direction of the screw shaft 23 towards the sliding contact bush 76.

Accordingly, the dimensional error, the assembling error, and the like, between the screw shaft 23 and the sliding contact bush 76 are tolerated by the elastic biasing mechanism structured with the elastic washer 74 and the connecting nut 46. Accordingly, the intermediate member 7 allows the screw shaft 23 to rotate smoothly relative to the bolt 32 fixedly connected to the front supporting bracket 31.

According to the fourth embodiment, the flange portion 75b (the elastic thrust portion) radially protrudes from the cylindrical portion 75a (the radial portion at which the radial sliding contact surface is formed) of the elastic bush 75. Further, the groove portion 75d is formed at the flange portion 75b of the elastic bush 75.

Due to the above described structure, the flange portion 75b of the elastic bush 75 is elastically deformed by the connecting nut 46, and the front end surface of the flange portion 76b (according to the fourth embodiment, serving as the first sliding contact surface) of the sliding contact bush 76 and the rear end surface of the flange portion 75b (according to the fourth embodiment, serving as the second sliding contact surface) of the elastic bush 75 are arranged to elastically contact the rear and front end surfaces of the supporting portion 32b of the bolt 32, respectively. Accordingly, the intermediate member 7 and the connecting nut 46 are assembled onto the screw shaft 23 without a clearance between the intermediate member 7 and the connecting nut 46. Accordingly, the dimensional error, the assembling error, and the like, between the screw shaft 23 and the sliding contact bush 76 are tolerated by the elastic biasing member structured with the elastic bush 75 and the connecting nut 46. Accordingly, the intermediate member 7 allows the screw shaft 23 to rotate smoothly relative to the bolt 32 fixedly connected to the front supporting bracket 31.

According to the fifth embodiment, the intermediate member 8 includes the front sliding contact member 81 (the radial-thrust member), which has the cylindrical portion 81a (the radial portion at which the radial sliding contact surface is formed) and the flange portion 81b (the thrust portion at which one of the first and second sliding contact surfaces is formed) radially outwardly protruding from the cylindrical portion 81a. According to the fifth embodiment, the rear end surface of the flange portion 81b serves as the one of the first and second sliding contact surfaces. The elastic biasing mechanism includes the annular elastic member 84, which is provided between the flange portion 81b and one of the connecting nut 44 and the fitting member 83 (thrust receiving member) and the connecting nut 46 connected onto the front screw portion 23c of the screw shaft 23, for elastically biasing the front sliding contact member 81 in the axial direction of the screw shaft 23 towards the fitting member 83.

Due to the above described structure, the dimensional error, the assembling error, and the like, between the screw shaft 23 and the fitting member 83 are tolerated by the annular elastic member 84. Accordingly, the intermediate member 8 allows the screw shaft 23 to smoothly rotate relative to the bolt 32 fixedly connected to the front supporting bracket 31. Further, the sliding contact member 80 performs the slide-contact function, while the annular elastic member 84 performs the elastic function. Thus, because the different members respectively achieve the slide-contact function and the elastic function, a maximum effect of each function is achieved.

Further according to the fifth embodiment, the annular elastic member 84 includes the circular cross sectional shape.

Due to the above described structure, the annular elastic member 84 circularly linearly contacts the front sliding contact member 81 and the connecting nut 46 fixed to the screw shaft 23 and applies the elastic force thereto symmetrically relative to the axial center thereof (axial center corresponding to the axial center of the screw shaft 23). Further, a circularly linear contacting portion of the annular elastic member 84, i.e., a range between a portion where the annular elastic member 84 circularly linearly contacts the front sliding contact member 81 and a portion where the annular elastic member 84 circularly linearly contacts the connecting nut 46, is arranged to have a large thickness. Thus, when the annular elastic member 84 is compressed by the front sliding contact portion 81 and the connecting nut 46, the annular elastic member 84 is deformed (compressed) sufficiently in a balanced manner relative to the axial center thereof. Thus, the annular elastic member 84 elastically biases the front sliding contact member 81 in the thrust direction towards the fitting member 83 with a satisfactory balanced elastic force.

According to the third, fourth and fifth embodiments, the screw shaft 23 includes the fitting portion 23d (unthreaded portion) at a portion radially facing the bolt 32 (the front supporting bracket 31).

A load such as a seat weight is continuously applied to the fitting portion 23d of the screw shaft 23 from the bolt 32 via the intermediate member 7/8. Accordingly, in a condition where a thread portion is formed at the fitting portion 23d of the screw shaft 23, the thread portion may be damaged by the load applied from the bolt 32. However, due to the above described structure, the fitting portion 23d of the screw shaft 23 and the inner circumferential surface of the shaft bore 83d of the fitting member 83, which face the fitting portion 23d of the screw shaft 23, are not threaded. Accordingly, the load is prevented from being applied intensively to the fitting portion 23d facing the bolt 32 in the radial direction, thereby preventing the screw shaft 23 from being damaged. Therefore, the feeding nut 24 is stably screwed onto the rear screw portion 23a (the feeding screw portion) of the screw portion 23, and the connecting nut 46 is also stably tightened onto the front screw portion 23c (connecting screw portion) of the screw shaft 23. As a consequence, the feeding operation of the feeding apparatus is smoothly performed by the relative movement between the feeding screw portion 23c of the screw shaft 23 and the feeding nut 24.

Further according to the fifth embodiment, the annular supporting portion 81c is formed by bending the outer circumferential portion of the flange portion 81b in the axial direction of the screw shaft 23. Further, the outer circumferential portion of the annular elastic member 84 is supported by the annular supporting portion 81c.

When a large load is applied to the annular elastic member 84, the annular elastic member 84 is compressed to dislocate in the radially outward direction. However, because the annular supporting portion 81c supports the annular elastic member 84, the annular elastic member 84 is prevented from dislocating in the axial direction. Thus, the annular elastic member 84 is supported between the flange portion 81b of the front sliding contact member 81 and the one of the connecting nut 46 and the fitting member 83, thereby greatly improving (extending) the useful life of the annular elastic member 84.

Further, according to the first to fifth embodiments, the lower rail 21 is employed as the fixture member adapted to be mounted on the vehicle floor 11, and the upper rail 22 is employed as the movable member adapted to support the vehicle seat 10 and to be relatively movably supported by the lower rail 21. Further, the feeding apparatus according to the embodiments is adapted to be mounted on the power seat slide apparatus 12 having the lower rail 21 and the upper rail 22.

Due to the above described structure, because the feeding apparatus is applied to the power seat slide apparatus 12, the screw shaft 23 is allowed to smoothly rotate, and the upper rail 22 is smoothly slidably move relative to the lower rail 21.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A feeding apparatus, comprising
a screw shaft provided between a fixture member and a movable member relatively movably supported by the fixture member, the screw shaft rotatably supported by one of the fixture member and the movable member, the screw shaft extending in a moving direction of the movable member;
a feeding nut connected to the other of the fixture member and the movable member and screwed onto a feeding screw portion of the screw shaft;
a supporting member provided at the one of the fixture member and the movable member;
a driving unit for transmitting a rotational driving torque to the screw shaft;
an intermediate member supported by the screw shaft and arranged to be rotatable relative to the supporting member, the intermediate member including a radial sliding contact surface slidably contacting a radial bearing surface of the supporting member, a first thrust sliding contact surface slidably contacting a first thrust bearing surface formed at a first side portion of the supporting member, and a second thrust sliding contact surface contacting a second thrust bearing surface formed at a second side portion of the supporting member; and
an elastic biasing mechanism for elastically biasing the first and second thrust sliding contact surfaces of the intermediate member to contact the first and second thrust bearing surfaces in an axial direction of the screw shaft, respectively, and for elastically biasing the intermediate member in the axial direction of the screw shaft to a thrust receiving member provided at the screw shaft for assembling the intermediate member and the thrust receiving member onto the screw shaft without a clearance between the intermediate member and the thrust receiving member.

2. A feeding apparatus, according to claim 1, wherein
the elastic biasing mechanism comprises an elastic thrust portion at which one of the first and second thrust sliding contact surfaces is formed, and a connecting nut mounted onto a connecting screw portion formed at the screw shaft at an axially opposite side of the thrust receiving member relative to the supporting member,
the elastic thrust portion radially protrudes from a radial portion at which the radial sliding contact surface is formed, and inclines in the axial direction of the screw shaft from a radially inward portion to a radially outward portion thereof, and wherein
the elastic thrust portion is elastically deformed by tightening the connecting nut onto the connecting screw portion, whereby
the first and second thrust sliding contact surfaces elastically contact the first and second thrust bearing surfaces, respectively, and the intermediate member is elastically biased in the axial direction of the screw shaft towards the thrust receiving member.

3. A feeding apparatus according to claim 2, wherein
the connecting nut is tightened to the screw shaft in a condition in which the elastic thrust portion is elastically deformed in the axial direction of the screw shaft with a tightening torque for preventing the connecting nut from loosening by a rotation of the screw shaft.

4. A feeding apparatus according to claim 2, wherein
the thrust receiving member is tightened to a partial screw portion formed at an outer circumferential surface of the screw shaft so as to be fixedly connected thereto.

5. A feeding apparatus according to claim 1, wherein
the intermediate member includes a radial portion at which the radial sliding contact surface is formed, an annular elastic thrust portion at which one of the first and second thrust sliding contact surfaces is formed, and a thrust portion at which the other of the first and second sliding contact surfaces is formed,
the radial portion fits the screw shaft,
the annular elastic thrust portion is elastically deformable in the axial direction of the screw shaft at a radially inward portion and a radially outward portion thereof, and
the elastic biasing mechanism comprises the elastic thrust portion of the intermediate member and a connecting nut mounted onto a connecting screw portion formed at the screw shaft at an axially opposite side of the thrust receiving member relative to the supporting member, and wherein
the elastic thrust portion is elastically deformed by tightening the connecting nut onto the connecting screw portion, whereby
the thrust portion is elastically biased towards the corresponding thrust bearing surface and the intermediate member is pressed in the axial direction of the screw shaft towards the thrust receiving member.

6. A feeding apparatus according to claim 5, wherein
the thrust receiving member is tightened to a partial screw portion formed at an outer circumferential surface of the screw shaft so as to be fixedly connected thereto.

7. A feeding apparatus according to claim 5, wherein
the connecting nut is tightened to the screw shaft in a condition in which the elastic thrust portion is elastically deformed in the axial direction of the screw shaft with a tightening torque for preventing the connecting nut from loosening by a rotation of the screw shaft.

8. A feeding apparatus according to claim 1, wherein
the thrust receiving member is tightened to a partial screw portion formed at an outer circumferential surface of the screw shaft so as to be fixedly connected thereto.

9. A feeding apparatus according to claim 8, wherein
the connecting nut is tightened to the screw shaft in a condition in which the elastic thrust portion is elastically deformed in the axial direction of the screw shaft with a tightening torque for preventing the connecting nut from loosening by a rotation of the screw shaft.

10. A feeding apparatus according to claim 1, wherein
the intermediate member includes an elastic thrust portion at which one of the first and second thrust sliding contact surfaces is formed,
the thrust receiving member includes a thrust portion at which the other of the first and second thrust sliding contact surfaces is formed,
the elastic thrust portion is provided between one of the first and second thrust bearing surfaces of the supporting member and a connecting nut mounted onto a connecting screw portion formed at the screw shaft at an axially opposite side of the thrust receiving member relative to the supporting member, the elastic biasing mechanism comprises the elastic thrust portion of the intermediate member and the connecting nut, and wherein the elastic thrust portion is elastically deformed by tightening the connecting nut onto the connecting screw portion, whereby the first and second thrust sliding contact surfaces elastically contact the corresponding first and second thrust bearing surfaces, and the elastic thrust portion is elastically biased towards the thrust receiving member.

11. A feeding apparatus according to claim 10, wherein the screw shaft includes an unthreaded portion at a portion radially facing the supporting member.

12. A feeding apparatus according to claim 10, wherein the elastic thrust portion radially protrudes from a radial portion, at which the radial sliding contact surface is formed, and a groove portion is formed at the elastic thrust portion.

13. A feeding apparatus according to claim 12, wherein the screw shaft includes an unthreaded portion at a portion radially facing the supporting member.

14. A feeding apparatus according to claim 1, wherein the intermediate member includes a radial-thrust member having a radial portion and a thrust portion radially outwardly protruding from the radial portion, the radial sliding contact surface is formed at the radial portion of the radial-thrust member, one of the first and second sliding contact surfaces is formed at the thrust portion of the radial-thrust member, and wherein the elastic biasing mechanism includes an annular elastic member being provided between the thrust portion and one of the thrust receiving member and a connecting nut connected onto a connecting screw portion formed at the screw shaft for elastically biasing the radial-thrust member in the axial direction of the screw shaft towards the thrust receiving member.

15. A feeding apparatus according to claim 14, wherein the annular elastic member includes a circular cross sectional shape.

16. A feeding apparatus according to claim 14, wherein an annular supporting portion is formed by bending an outer circumferential portion of the thrust portion in the axial direction of the screw shaft, and an outer circumferential portion of the elastic annular member is supported by the annular supporting portion.

17. A feeding apparatus according to claim 16, wherein the screw shaft includes an unthreaded portion at a portion radially facing the supporting member.

18. A feeding apparatus according to claim 14, wherein the screw shaft includes an unthreaded portion at a portion radially facing the supporting member.

19. A feeding apparatus according to claim 1, wherein the fixture member includes a lower rail adapted to be mounted on a vehicle floor, the movable member includes an upper rail adapted to support a vehicle seat and to be relatively movably supported by the lower rail, and the feeding apparatus is adapted to be mounted on a power seat slide apparatus having the lower rail and the upper rail.

20. A feeding apparatus according to claim 19, wherein the screw shaft includes an unthreaded portion at a portion radially facing the supporting member.

* * * * *